US011978449B2

(12) United States Patent
Choi et al.

(10) Patent No.: US 11,978,449 B2
(45) Date of Patent: May 7, 2024

(54) ELECTRONIC DEVICE FOR PROCESSING USER UTTERANCE AND OPERATION METHOD THEREFOR

(71) Applicant: Samsung Electronics Co., Ltd., Suwon-si (KR)

(72) Inventors: Jinho Choi, Suwon-si (KR); Gajin Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 285 days.

(21) Appl. No.: 17/518,992

(22) Filed: Nov. 4, 2021

(65) Prior Publication Data

US 2022/0284894 A1 Sep. 8, 2022

Related U.S. Application Data

(63) Continuation of application No. PCT/KR2021/015456, filed on Oct. 29, 2021.

(30) Foreign Application Priority Data

Mar. 2, 2021 (KR) ........................ 10-2021-0027500

(51) Int. Cl.
*G10L 15/22* (2006.01)
*G10L 15/30* (2013.01)
*G10L 17/24* (2013.01)

(52) U.S. Cl.
CPC .............. *G10L 15/22* (2013.01); *G10L 15/30* (2013.01); *G10L 17/24* (2013.01); *G10L 2015/223* (2013.01)

(58) Field of Classification Search
CPC ......... G10L 15/22; G10L 15/30; G10L 17/24; G10L 2015/223; G10L 2015/228
See application file for complete search history.

(56) References Cited

U.S. PATENT DOCUMENTS 6,233,559 B1 * 5/2001 Balakrishnan ............ G06F 3/16
704/E15.044
9,622,059 B2 4/2017 Bouzid et al.
(Continued)

FOREIGN PATENT DOCUMENTS

KR 10-2018-0006966 A 1/2018
KR 10-2020-0016774 A 2/2020
(Continued)

OTHER PUBLICATIONS

International Search Report and written opinion dated Jan. 27, 2022, issued in International Application No. PCT/KR2021/015456.

*Primary Examiner* — Douglas Godbold
(74) *Attorney, Agent, or Firm* — Jefferson IP Law, LLP

(57) ABSTRACT

An intelligent server is provided. The intelligent server includes a communication circuit; and at least one processor configured to receive a user utterance from an electronic device via the communication circuit, identify a first category associated with the user utterance, among a plurality of categories stored in the intelligent server, identify a plurality of voice assistant applications included in the first category, transmit information on the plurality of voice assistant applications to the electronic device, receive, from the electronic device, information about a first application, identified to satisfy a designated condition based on at least one parameter associated with a function corresponding to the user utterance, identify a first voice assistant application corresponding to the first application by using the information about the first application, generate result information for performing the function by using the first voice assistant application, and transmit the result information to the electronic device.

15 Claims, 22 Drawing Sheets

(56) References Cited

U.S. PATENT DOCUMENTS

| | | | |
|---|---|---|---|
| 9,666,187 B1 | 5/2017 | Pinsky et al. | |
| 9,741,343 B1* | 8/2017 | Miles | G10L 15/26 |
| 10,229,684 B2* | 3/2019 | Li | G10L 15/1822 |
| 10,504,512 B1* | 12/2019 | Sarikaya | G06F 40/295 |
| 10,699,704 B2* | 6/2020 | Kim | G10L 15/183 |
| 10,770,093 B2 | 9/2020 | James | |
| 10,923,113 B1* | 2/2021 | Nori | G10L 15/1822 |
| 11,532,301 B1* | 12/2022 | Hajebi | G10L 15/1815 |
| 11,551,681 B1* | 1/2023 | Pandey | G06N 5/022 |
| 11,568,863 B1* | 1/2023 | Sarikaya | G10L 15/02 |
| 11,640,823 B1* | 5/2023 | Pemberton | G10L 13/08 |
| | | | 704/260 |
| 11,756,538 B1* | 9/2023 | Dell | G10L 15/02 |
| | | | 704/232 |
| 2016/0203002 A1 | 7/2016 | Kannan et al. | |
| 2016/0293164 A1 | 10/2016 | Shi et al. | |
| 2016/0335138 A1* | 11/2016 | Surti | H04L 67/51 |
| 2018/0053507 A1* | 2/2018 | Wang | G10L 15/18 |
| 2019/0103114 A1 | 4/2019 | Wang | |
| 2019/0166403 A1 | 5/2019 | Yelton et al. | |
| 2020/0005771 A1* | 1/2020 | Du | G06F 3/167 |
| 2020/0051560 A1 | 2/2020 | Yi et al. | |
| 2020/0097223 A1 | 3/2020 | Sherma et al. | |
| 2020/0118563 A1 | 4/2020 | Yun et al. | |
| 2020/0264839 A1 | 8/2020 | Yang et al. | |
| 2020/0335094 A1 | 10/2020 | Kim et al. | |
| 2020/0388285 A1* | 12/2020 | Spiewla | G10L 15/22 |
| 2021/0158814 A1* | 5/2021 | Hussain | G06F 9/54 |
| 2022/0399023 A1* | 12/2022 | Gyanchandani | G06N 20/00 |

FOREIGN PATENT DOCUMENTS

| | | |
|---|---|---|
| KR | 10-2020-0040562 A | 4/2020 |
| KR | 10-2020-0099380 A | 8/2020 |

* cited by examiner

ELECTRONIC DEVICE FOR PROCESSING USER UTTERANCE AND OPERATION METHOD THEREFOR

CROSS-REFERENCE TO RELATED APPLICATION(S)

This application is a continuation application, claiming priority under § 365(c), of an International Application No. PCT/KR2021/015456, filed on Oct. 29, 2021, which is based on and claims the benefit of a Korean patent application number 10-2021-0027500, filed on Mar. 2, 2021, in the Korean Intellectual Property Office, the disclosures of which is incorporated by reference herein in its entirety.

BACKGROUND

Field

The disclosure relates to an electronic device for processing a user utterance and an operation method therefor.

Description of Related Art

Portable digital communication devices have become essential to many people in modern times. Customers desire to receive various high-quality services anywhere and anytime by using the portable digital communication devices.

A voice recognition service may be a service providing various content services to the customers in response to a received user voice, by using a voice recognition interface implemented through the portable digital communication devices. In order to provide the voice recognition service, technologies (e.g., automatic voice recognition, natural language understanding, natural language generation, machine translation, a dialog system, questions and answers, or voice recognition/synthesis, etc.) for recognizing and analyzing human language may be implemented in the portable digital communication devices.

In order to provide a high-quality voice recognition service to the customers, a technology for correctly identifying a user's intention from a user voice and a technology for providing an appropriate context service corresponding to the identified user's intention are required to be implemented.

The above information is presented as background information only to assist with an understanding of the disclosure. No determination has been made, and no assertion is made, as to whether any of the above might be applicable as prior art with regard to the disclosure.

An intelligent server may process a user utterance and store a plurality of voice assistant apps (or capsules) for providing a voice recognition service. Each of the plurality of voice assistant apps is implemented to correspond to a designated application, and, as learning utterances to process the plurality of utterances, may output information allowing processing of a received user utterance and performing of a designated application function. The plurality of voice assistant apps may be classified in units of categories, and the intelligent server may identify a voice assistant group corresponding to (or appropriate for) a currently received user utterance according to the classification. However, when the plurality of voice assistant apps are included in one category, an operation of selecting one voice assistant app among the plurality of voice assistant apps by a user is required, whereby user convenience may be reduced. In addition, when the voice assistant app selected by the user fails to process the user utterance, an operation of selecting a voice assistant app again is required to be performed, whereby user convenience may be reduced and an operation burden may increase.

Aspects of the disclosure are to address at least the above-mentioned problems and/or disadvantages and to provide at least the advantages described below. Accordingly, according to various embodiments, an electronic device and an operation method therefor may be provided, wherein a voice assistant app is selected by using context information of applications corresponding to the plurality of voice assistant apps, and whereby enhanced user convenience can be achieved.

In addition, according to various embodiments, an electronic device and an operation method therefor may be provided, wherein a voice assistant app corresponding to an application having context information satisfying a condition for performing a function corresponding to the user utterance is selected, and thus it is unnecessary to perform an operation of selecting the voice assistant app again, whereby enhanced user convenience can be achieved and an operational burden can be reduced.

SUMMARY

Additional aspects will be set forth in part in the description which follows and, in part, will be apparent from the description, or may be learned by practice of the presented embodiments.

Various embodiments may provide an intelligent server is provided. The intelligent server includes a communication circuit, and at least one processor, wherein the at least one processor is configured to receive a user utterance from an electronic device via the communication circuit, identify a first category associated with the received user utterance, among the plurality of categories stored in the intelligent server, identify a plurality of voice assistant applications included in the first category, transmit, to the electronic device, information about the plurality of voice assistant applications, receive, from the electronic device, information about a first application, which is identified to satisfy a designated condition included in the information about the plurality of voice assistant applications according to at least one parameter associated with a function corresponding to the user utterance, identify a first voice assistant app corresponding to the first application among the plurality of voice assistant applications by using the information about the first application, generate result information for performing the function corresponding to the user utterance by using the first voice assistant application, and transmit the generated result information to the electronic device.

Various embodiments may provide an electronic device is provided. The electronic device includes a microphone, a communication circuit, and at least one processor, wherein the at least one processor is configured to acquire, based on an intelligent application for providing a voice recognition service, a user utterance by using the microphone, transmit, to an intelligent server, the user utterance via the communication circuit, receive, from the intelligent server, first information about a plurality of voice assistant applications corresponding to the user utterance, obtain at least one piece of context information of a plurality of applications corresponding to at least one parameter associated with a function corresponding to the user utterance, the at least one parameter being included in the first information, identify a first application having the at least one piece of context information satisfying a designated condition included in the first information, among the plurality of applications, transmit, to the intelligent server, information about the identified first application via the communication circuit, and receive, from the intelligent server, result information from the intelligent server when the information about the first application is transmitted, and control the first application to perform the function corresponding to the user utterance according to the received result information.

Various embodiments may provide an operation method of an intelligent server is provided. The operation method includes receiving a user utterance from an electronic device via a communication circuit, identifying a first category associated with the received user utterance, among a plurality of categories stored in the intelligent server, identifying a plurality of voice assistant applications included in the first category, transmitting, to the electronic device, information about the plurality of voice assistant applications receiving, from the electronic device, information about a first application, which is identified to satisfy a designated condition included in the information about the plurality of voice assistant applications according to at least one parameter associated with a function corresponding to the user utterance, identifying a first voice assistant app corresponding to the first application, among the plurality of voice assistant applications by using the information about the first application, generating result information for performing the function corresponding to the user utterance by using the first voice assistant application and transmitting the generated result information to the electronic device.

Various embodiments may provide an operation method of an electronic device is provided. The operation method includes acquiring, based on an intelligent application for providing a voice recognition service, a user utterance by using a microphone, transmitting, to an intelligent server, the user utterance via a communication circuit, receiving, from the intelligent server, first information on the plurality of voice assistant applications corresponding to the user utterance, obtaining at least one piece of context information of a plurality of applications corresponding to at least one parameter associated with a function corresponding to the user utterance, the at least one parameter being included in the first information, identifying a first application having the at least one piece of context information satisfying a designated condition included in the first information, among the plurality of applications, transmitting, to the intelligent server, information on the first application via the communication circuit, receiving, from the intelligent server, result information when the information on the first application is transmitted, and controlling the first application to perform the function corresponding to the user utterance according to the received result information.

According to various embodiments, solutions of the disclosure are not limited to the aforementioned solutions, and other solutions, which are not mentioned above, may be clearly understood by those skilled in the art, to which the disclosure pertains, from the description below and the accompanying drawings.

According to various embodiments, an electronic device and an operation method therefor may be provided, wherein a voice assistant app is selected by using context information of applications corresponding to the plurality of voice assistant apps, and whereby enhanced user convenience can be achieved.

According to various embodiments, an electronic device and an operation method therefor may be provided, wherein a voice assistant app corresponding to an application having context information satisfying a condition for performing a function corresponding to the user utterance is selected, and thus it is unnecessary to perform an operation of selecting the voice assistant app again, whereby enhanced user convenience can be achieved and an operational burden can be reduced.

Other aspects, advantages, and salient features of the various embodiments will become apparent to those skilled in the art from the following detailed description, which, taken in conjunction with the annexed drawings, discloses various embodiments of the disclosure.

BRIEF DESCRIPTION OF THE DRAWINGS

The aspects, features, and advantages of various embodiments will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the various embodiments as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the various embodiments. In addition, descriptions of well-known functions and constructions may be omitted for clarity and conciseness.

The terms and words used in the following description and claims are not limited to the bibliographical meanings, but, are merely used by the inventor to enable a clear and consistent understanding of the various embodiments. Accordingly, it should be apparent to those skilled in the art that the following description of various embodiments of the various embodiments is provided for illustration purpose only and not for the purpose of limiting the various embodiments as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
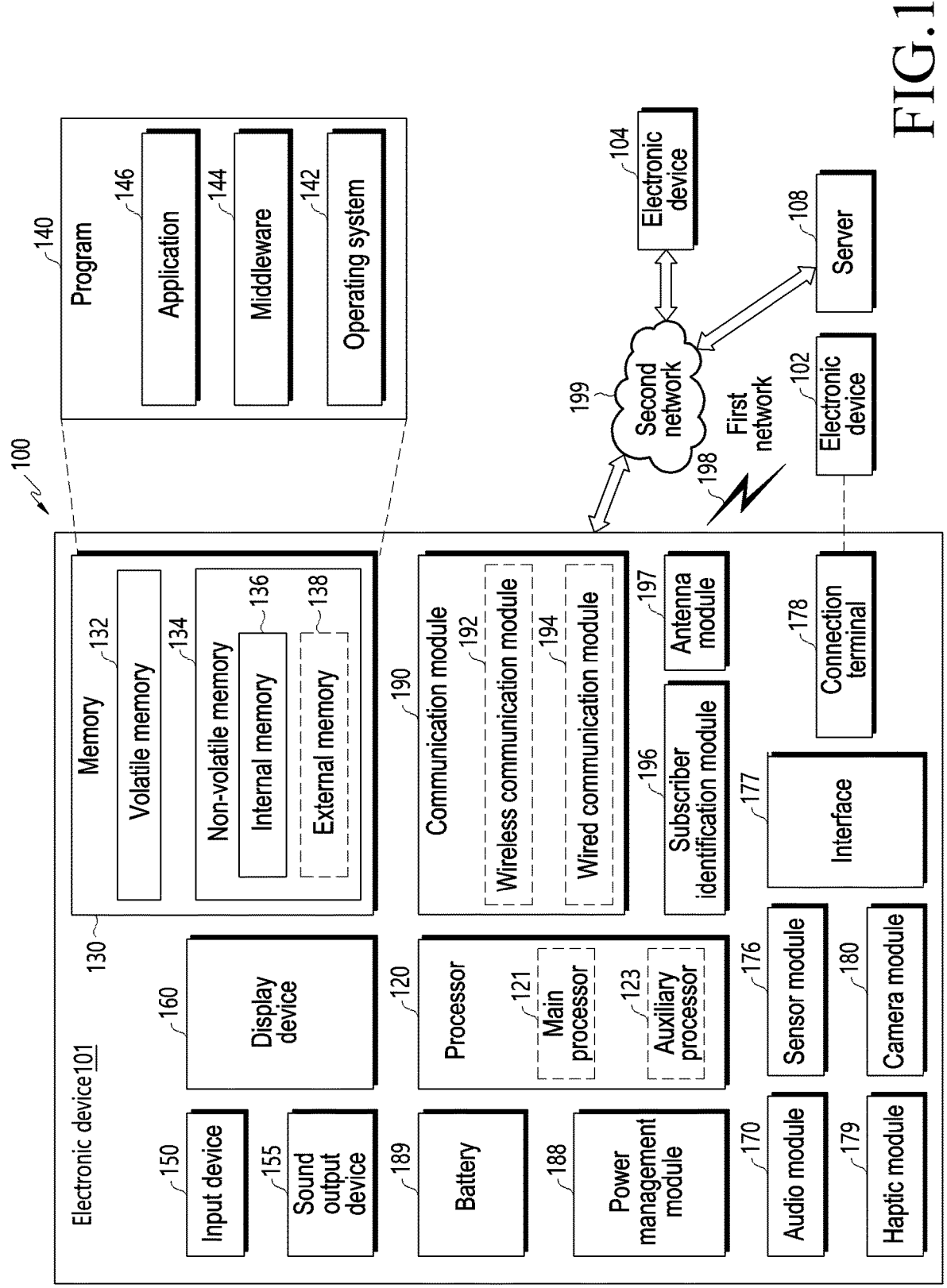
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive the plurality of—input and the plurality of—output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, an electronic device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or the plurality of entities, and some of the plurality of entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
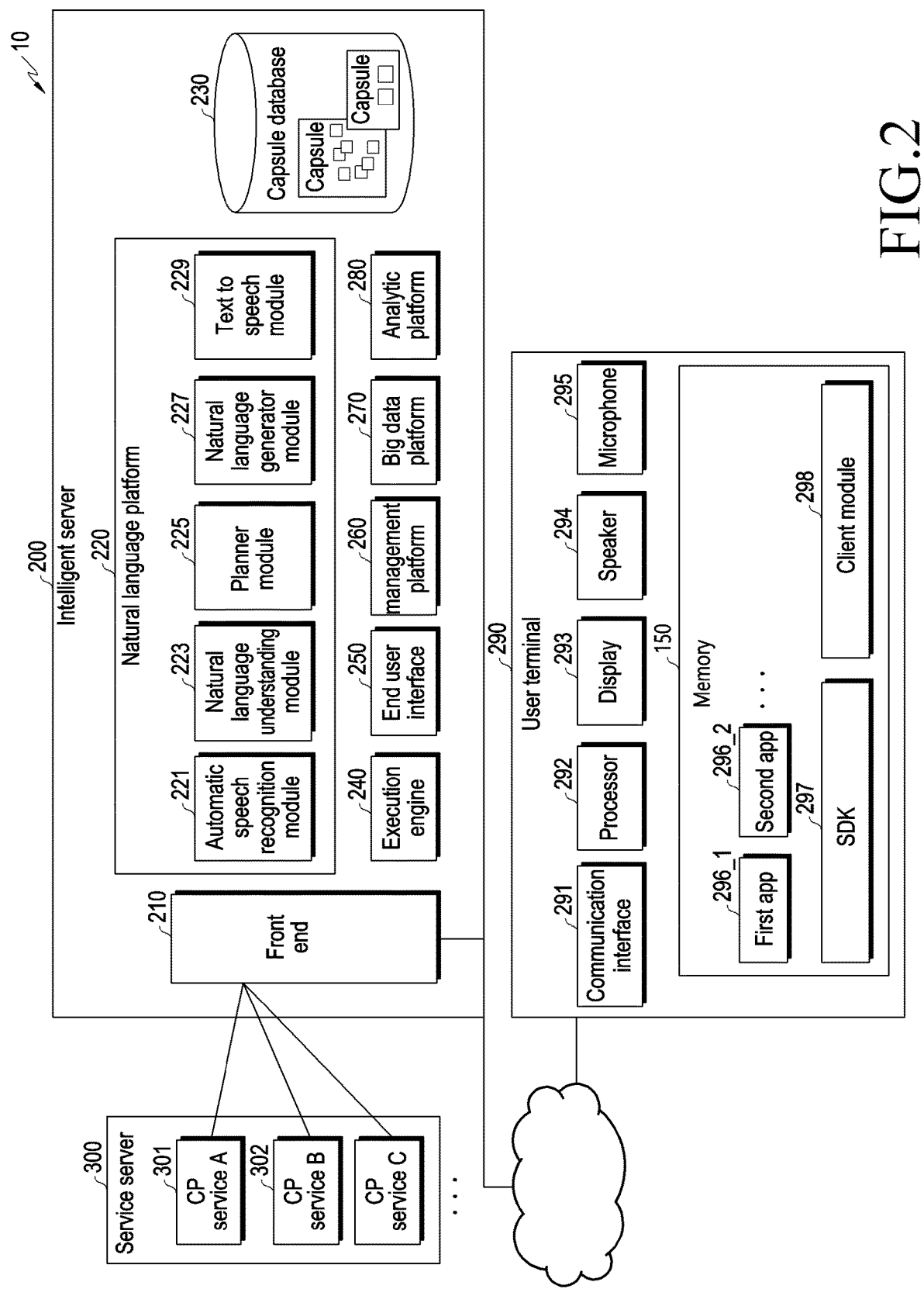
FIG. 2 is a block diagram illustrating an integrated intelligence system according to various embodiments.

FIG. 2 is a block diagram illustrating an integrated intelligence system according to various embodiments.

Referring to FIG. 2, an integrated intelligence system 10 of an embodiment may include a user terminal 290, an intelligent server 200, and a service server 300.

The user terminal 290 of an embodiment may be a terminal device (or an electronic device) which can be connected to the Internet and may be, for example, a mobile phone, a smartphone, a personal digital assistant (PDA), a laptop computer, a television (TV), a home appliance, an electronic device, a head mounted device (HMD), or a smart speaker.

According to an embodiment illustrated, the user terminal 290 may include a communication interface 291, a microphone 295, a speaker 294, a display 293, a memory 299, or a processor 292. The above-enumerated elements may be operatively or electrically connected to each other.

The communication interface 291 of an embodiment may be connected to an external device and configured to transmit or receive data to or from the external device. The microphone 295 of an embodiment may receive a sound (e.g., a user utterance) and convert the sound into an electrical signal. The speaker 294 of an embodiment may output an electrical signal as a sound (e.g., a voice). The display 293 of an embodiment may be configured to display an image or video. The display 293 of an embodiment may also display a graphical user interface (GUI) of an executed app (or an application program).

The memory 299 of an embodiment may store a client module 298, a software development kit (SDK) 297, and the plurality of apps 296. The client module 298 and the SDK 297 may configure a framework (or a solution program) for performing a universal function. In addition, the client module 298 or the SDK 297 may configure a framework for processing a voice input.

The plurality of apps 296 stored in the memory 299 of an embodiment may be a program for performing a designated function. According to an embodiment, the plurality of apps 296 may include a first app 296_1 and a second app 296_2. According to an embodiment, each of the plurality of apps 296 may include the plurality of operations for performing a designated function. For example, the apps may include an alarm app, a message app, and/or a schedule app. According to an embodiment, the plurality of apps 296 may be executed by the processor 292 and sequentially execute at least some of the plurality of operations.

The processor 292 of an embodiment may control an overall operation of the user terminal 290. For example, the processor 292 may be electrically connected to the communication interface 291, the microphone 295, the speaker 294, and the display 293 to perform a designated operation.

The processor 292 of an embodiment may also execute a program stored in the memory 299 to perform a designated function. For example, the processor 292 may execute at least one of the client module 298 or the SDK 297 to perform a subsequent operation for processing a voice input. For example, the processor 292 may control operations of the plurality of apps 296 through the SDK 297. An operation of the client module 298 or the SDK 297 to be described below may be an operation by the execution of the processor 292.

The client module 298 of an embodiment may receive a voice input. For example, the client module 298 may receive a voice signal corresponding to a user utterance which is detected through the microphone 295. The client module 298 may transmit the received voice input to the intelligent server 200. The client module 298 may transmit state information of the user terminal 290 to the intelligent server 200, together with the received voice input. The state information may be, for example, app execution state information.

The client module 298 of an embodiment may receive a result corresponding to the received voice input. For example, when the result corresponding to the received voice input can be calculated by the intelligent server 200, the client module 298 may receive the result corresponding to the received voice input from the intelligent server 200. The client module 298 may display the received result on the display 293.

The client module 298 of an embodiment may receive a plan corresponding to the received voice input. The client module 298 may display, on the display 293, a result of executing the plurality of operations of an app according to the plan. For example, the client module 298 may sequentially display the result of execution of the plurality of operations on the display 293. In another example, the user terminal 290 may display only a part of the result (e.g., a result of the last operation) of execution of the plurality of operations, on the display 293.

According to an embodiment, the client module 298 may receive a request for obtaining information necessary to calculate the result corresponding to a voice input, from the intelligent server 200. According to an embodiment, in response to the request, the client module 298 may transmit the necessary information to the intelligent server 200.

The client module 298 of an embodiment may transmit result information of executing the plurality of operations according to a plan, to the intelligent server 200. By using the result information, the intelligent server 200 may identify that the received voice input is correctly processed.

The client module 298 of an embodiment may include a voice recognition module. According to an embodiment, the client module 298 may recognize a voice input of performing a restricted function through the voice recognition module. For example, the client module 298 may perform an intelligent app for processing a voice input for performing a systematic operation through a designated input (e.g., wake up!).

The intelligent server 200 of an embodiment may receive information related with a user voice input from the user terminal 290 through a communication network. According to an embodiment, the intelligent server 200 may change data related to the received voice input to text data. According to an embodiment, the intelligent server 200 may generate a plan for performing a task corresponding to the user voice input by using the text data.

According to an embodiment, the plan may be generated by an artificial intelligent (AI) system. The artificial intelligent system may be a rule-based system, or may be a neural network-based system (e.g., a feedforward neural network (FNN)) and a recurrent neural network (RNN)). Alternatively, the artificial intelligent system may be either a combination of the aforementioned or an artificial intelligent system different therefrom. According to an embodiment, the plan may be selected from a set of predefined plans, or may be generated in real time in response to a user request. For example, the artificial intelligent system may select at least one plan among predefined the plurality of plans.

The intelligent server 200 of an embodiment may transmit a result of the generated plan to the user terminal 290, or transmit the generated plan to the user terminal 290. According to an embodiment, the user terminal 290 may display the result of the plan on the display 293. According to an embodiment, the user terminal 290 may display a result of executing an operation of the plan on the display 293.

The intelligent server 200 of an embodiment may include a front end 210, a natural language platform 220, a capsule database 230, an execution engine 240, an end user interface 250, a management platform 260, a big data platform 270, or an analysis platform 280.

The front end 210 of an embodiment may receive a voice input received from the user terminal 290. The front end 210 may transmit a response corresponding to the voice input.

According to an embodiment, the natural language platform 220 may include an automatic speech recognition module (ASR module) 221, a natural language understanding module (NLU module) 223, a planner module 225, a natural language generator module (NLG module) 227, or a text to speech module (TTS module) 229.

The automatic speech recognition module 221 of an embodiment may convert a voice input received from the user terminal 290 into text data. By using the text data of the voice input, the natural language understanding module 223 of an embodiment may identify a user's intention. For example, by performing syntactic analysis or semantic analysis, the natural language understanding module 223 may identify the user's intention. By using a linguistic feature (e.g., syntactic factor) of a morpheme or phrase, the natural language understanding module 223 of an embodiment may identify a meaning of a word extracted from the voice input, and match the identified meaning of the word with the intention, so as to determine the user's intention.

By using the intention and the parameter determined by the natural language understanding module 223, the planner module 225 of an embodiment may generate a plan. According to an embodiment, based on the determined intention, the planner module 225 may determine the plurality of domains necessary to perform a task. The planner module 225 may determine the plurality of operations included in each of the plurality of domains which are determined based on the intention. According to an embodiment, the planner module 225 may determine a parameter necessary to execute the determined the plurality of actions, or a result value output by the execution of the plurality of actions. The parameter and the result value may be defined with a concept of a designated form (or class). Accordingly, the plan may include the plurality of actions determined by the user's intention, and the plurality of concepts. The planner module 225 may determine a relationship between the plurality of actions and the plurality of concepts operationally (or hierarchically). For example, the planner module 225 may identify, based on the plurality of concepts, a sequence of executing the actions that are identified based on the user's intention. In other words, the planner module 225 may determine the sequence of executing the plurality of actions, based on the parameter necessary for execution of the plurality of actions and the result output by execution of the plurality of actions. Accordingly, the planner module 225 may generate a plan including association information (e.g., ontology) between the plurality of actions and the plurality of concepts. The planner module 225 may generate the plan by using information stored in a capsule database 230 in which a set of relationships between the concept and the actions is stored.

The natural language generator module 227 of an embodiment may change designated information to a text form. The information changed to the text form may be in a form of a natural language speech. The TTS module 229 of an embodiment may change the information in the text form to information in a voice form.

According to an embodiment, a partial function or whole function of a function of the natural language platform 220 may be implemented even in the user terminal 290.

The capsule database 230 may store information on a relationship between the plurality of concepts and actions corresponding to the plurality of domains. A capsule of an embodiment may include the plurality of action objects (or operation information) and concept objects (or concept information) which are included in a plan. According to an embodiment, the capsule database 230 may store the plurality of capsules in a form of a concept action network (CAN). According to an embodiment, the plurality of capsules may be stored in a function registry included in the capsule database 230.

The capsule database 230 may include a strategy registry in which strategy information necessary to determine a plan corresponding to a voice input is stored. When there are the plurality of plans corresponding to the voice input, the strategy information may include reference information for determining one plan from the plurality of plans. According to an embodiment, the capsule database 230 may include a follow up registry in which follow-up action information for proposing a follow-up action to a user in a designated condition is stored. The follow-up action may include, for example, a follow-up speech. According to an embodiment, the capsule database 230 may include a layout registry in which layout information of information output through the user terminal 290 is stored. According to an embodiment, the capsule database 230 may include a vocabulary registry in which vocabulary information included in capsule information is stored. According to an embodiment, the capsule database 230 may include a dialog registry in which information on a dialog (or an interaction) with a user is stored. The capsule database 230 may update the stored object by using a developer tool. The developer tool may include, for example, a function editor for updating an action object or a concept object. The developer tool may include a vocabulary editor for updating a vocabulary. The developer tool may include a strategy editor for generating and registering a strategy which determines a plan. The developer tool may include a dialog editor for generating a dialog with a user. The developer tool may include a follow up editor which can activate a follow up goal and edit a follow up speech providing a hint. The follow up goal may be determined based on a currently set goal, a user's preference, or an environmental condition. In an embodiment, the capsule database 230 may be implemented even in the user terminal 290.

The execution engine 240 of an embodiment may calculate a result by using the generated plan. The end user interface 250 may transmit the calculated result to the user terminal 290. Accordingly, the user terminal 290 may receive the result and provide the received result to a user. The management platform 260 of an embodiment may manage information used in the intelligent server 200. The big data platform 270 of an embodiment may collect a user's data. The analysis platform 280 of an embodiment may manage a quality of service (QoS) of the intelligent server 200. For example, the analysis platform 280 may manage an element and a processing speed (or efficiency) of the intelligent server 200.

The service server 300 of an embodiment may provide a designated service (e.g., a food order or a hotel reservation) to the user terminal 290. According to an embodiment, the service server 300 may be a server managed by a third party. The service server 300 of an embodiment may provide information for generating a plan corresponding to a received voice input to the intelligent server 200. The provided information may be stored in the capsule database 230. In addition, the service server 300 may provide information on the result of the plan to the intelligent server 200. The service server 300 may include voice assistants for processing user utterances, and the voice assistants may be stored in capsule form 301, 302, but are not limited to the described.

In the above-described integrated intelligence system 10, in response to a user input, the user terminal 290 may provide various intelligent services to the user. The user input may include, for example, an input through a physical button, a touch input, or a voice input.

In an embodiment, the user terminal 290 may provide a voice recognition service through an intelligent app (or a voice recognition app) stored therein. In this case, for example, the user terminal 290 may recognize a user utterance or a voice input received through the microphone, and provide a service corresponding to the recognized voice input to the user.

In an embodiment, the user terminal 290 may perform a designated operation independently, or together with the intelligent server 200 and/or the service server 300, based on a received voice input. For example, the user terminal 290 may execute an app corresponding to the received voice input, and perform a designated operation through the executed app.

In an embodiment, when the user terminal 290 provides a service together with the intelligent server 200 and/or the service server 300, the user terminal 290 may detect a user utterance by using the microphone 295, and generate a signal (or voice data) corresponding to the detected user utterance. The user terminal 290 may transmit the voice data to the intelligent server 200 by using the communication interface 291.

As a response to a voice input received from the user terminal 290, the intelligent server 200 according to an embodiment may generate a plan for performing a task corresponding to the voice input, or a result of performing an operation according to the plan. The plan may include, for example, the plurality of actions for performing a task corresponding to a user's voice input, and the plurality of concepts related to the plurality of actions. The concept may be obtained by defining a parameter input by execution of the plurality of actions, or a result value output by the execution of the plurality of actions. The plan may include association information between the plurality of actions and the plurality of concepts.

The user terminal 290 of an embodiment may receive the response by using the communication interface 291. The user terminal 290 may output a voice signal generated within the user terminal 290 to the outside by using the speaker 294, or output an image generated within the user terminal 290 to the outside by using the display 293.

Figure 3:
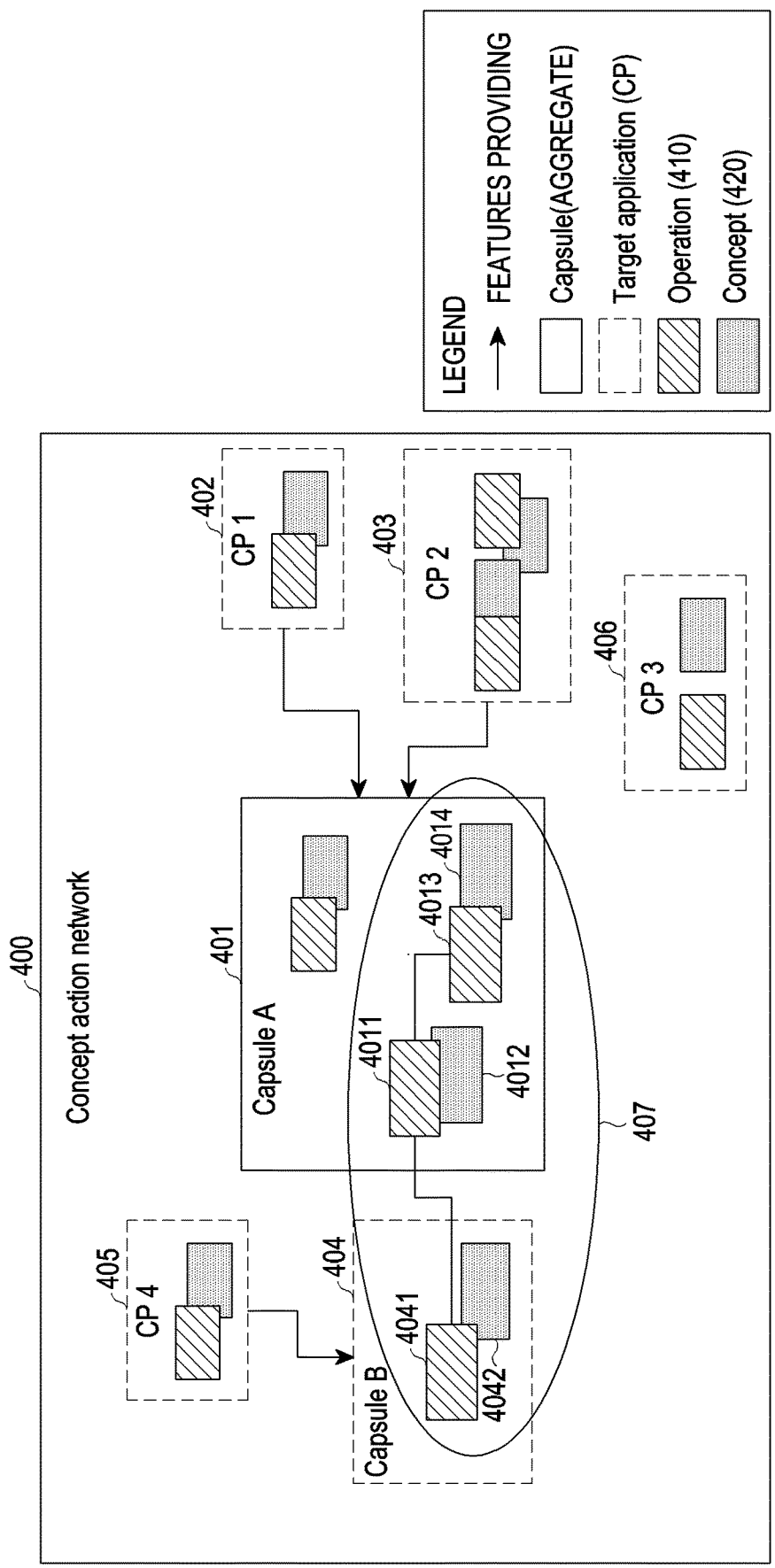
FIG. 3 illustrates a screen in which a voice input received through an intelligent app is processed by a user terminal according to various embodiments.

FIG. 3 illustrates a form in which information on a relationship between a concept and an action is stored in a database according to various embodiments.

A capsule database (e.g., the capsule database 230) of the intelligent server 200 may store a capsule in the form of a concept action network (CAN). The capsule database may store an action for processing a task corresponding to a user's voice input and a parameter necessary for the operation, in the form of the concept action network (CAN).

Referring to FIG. 3, the capsule database may store the plurality of capsules (capsule A 401 and capsule B 404) corresponding to the plurality of domains (e.g., applications), respectively. According to an embodiment, one capsule (e.g., capsule A 401) may correspond to one domain (e.g., a location (geo) and an application). In addition, one capsule may correspond to at least one service provider (e.g., CP1 402, CP2 403, CP3 406, or CP4 405) for performing a function of a domain related with the capsule. According to an embodiment, one capsule may include one or more actions 410 and one or more concepts 420 for performing a designated function.

The natural language platform 220 may generate a plan for performing a task corresponding to a received voice input, by using a capsule stored in a capsule database. For example, the planner module 225 of the natural language platform may generate the plan by using the capsule stored in the capsule database. For example, the planner module 225 may generate a plan 407 by using actions 4011 and 4013 and concepts 4012 and 4014 of capsule A 410 and an action 4041 and a concept 4042 of capsule B 404.

Figure 4:
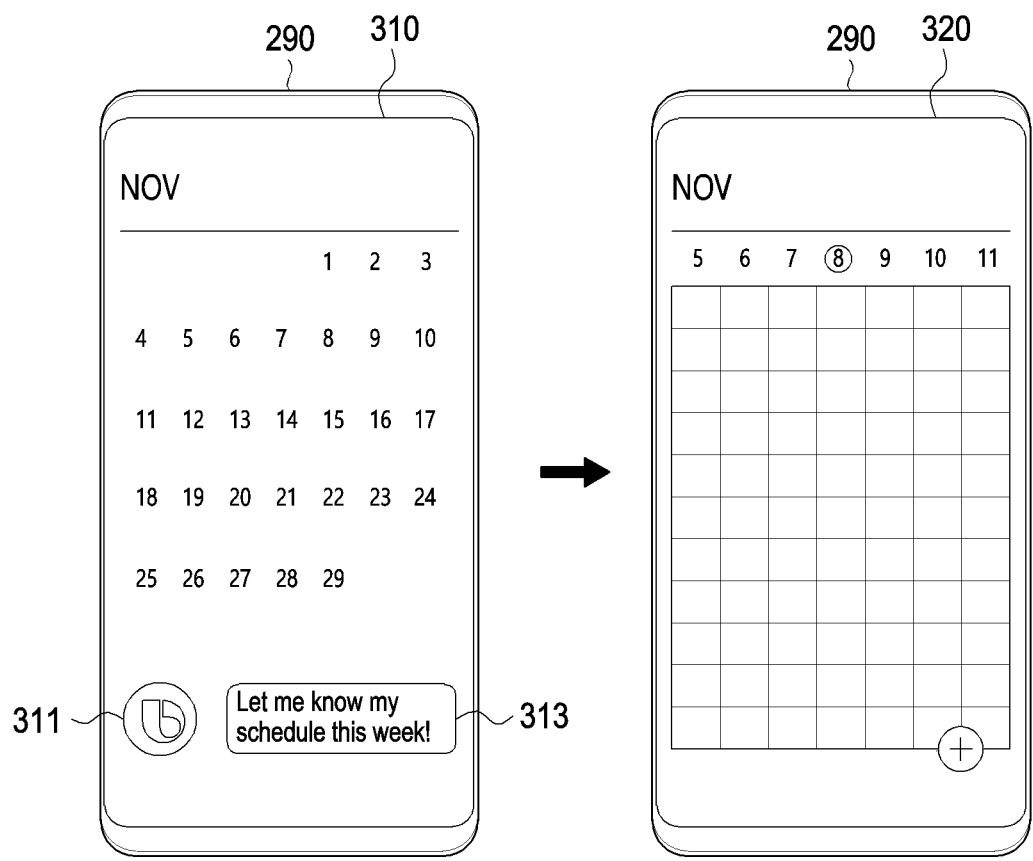
FIG. 4 illustrates a screen in which a voice input received through an intelligent app is processed by a user terminal according to various embodiments.

FIG. 4 illustrates a screen in which a voice input received through an intelligent app is processed by a user terminal according to various embodiments.

To process a user input through the intelligent server 200, the user terminal 290 may execute the intelligent app.

According to various embodiments, referring to FIG. 4, in screen 310, when recognizing a designated voice input (e.g., wake up!) or receiving an input through a hardware key (e.g., a dedicated hardware key), the user terminal 290 may execute the intelligent app for processing the voice input. For example, the user terminal 290 may execute the intelligent app in a state in which a schedule app is executed. According to an embodiment, the user terminal 290 may display an object (e.g., an icon) 311 corresponding to the intelligent app on the display 293. According to an embodiment, the user terminal 290 may receive a user input by a user utterance. For example, the user terminal 290 may receive a voice input of "Let me know my schedule this week!". According to an embodiment, the user terminal 290 may display a user interface (UI) 313 (e.g., an input window) of the intelligent app, in which text data of the received voice input is displayed, on the display.

According to an embodiment, in screen 320, the user terminal 290 may display a result corresponding to the received voice input on the display. For example, the user terminal 290 may receive a plan corresponding to the received user input, and display, on the display, "Your schedule this week" according to the plan.

Hereinafter, an example of an electronic device 501 and an intelligent server 503 is described according to various embodiments.

Figure 5:
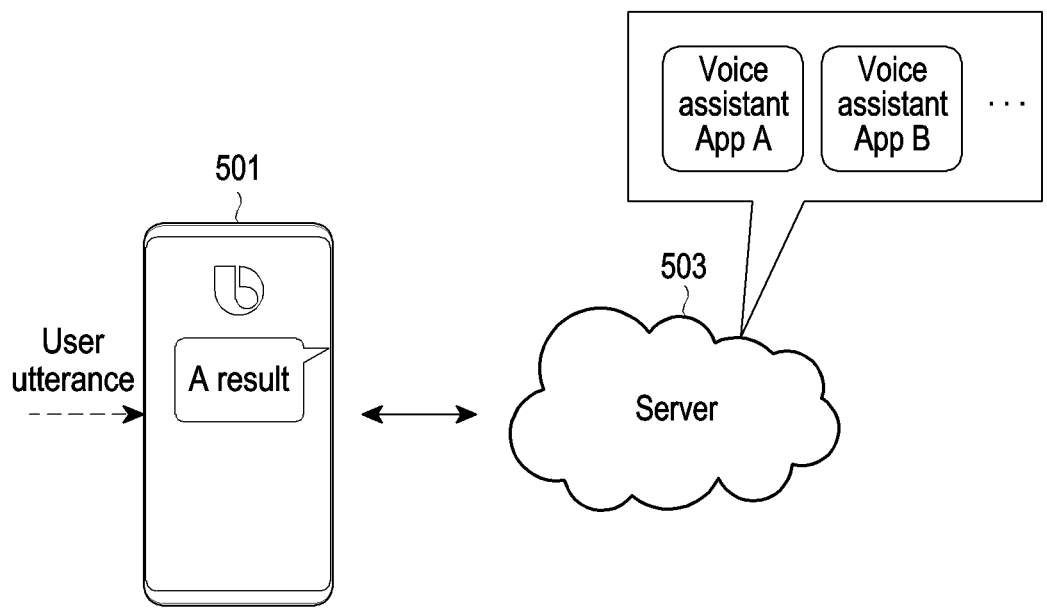
FIG. 5 illustrates an example of an electronic device and an intelligent server according to various embodiments.

FIG. 5 illustrates an example of an electronic device 501 and an intelligent server 503 according to various embodiments. Hereinafter, each of the electronic device 501 and the intelligent server 503 is described with reference to FIG. 5.

According to various embodiments, referring to FIG. 5, the electronic device 501 may perform an operation of providing (e.g., provision of result A) a function (or a service) corresponding to a user utterance. The function and/or service may be defined as a task. For example, the electronic device 501 may provide a task of a designated application corresponding to the user utterance. The task may include an activity, a page, and/or a state for providing a designated function of the designated application. In an embodiment, the electronic device 501 may execute an application (e.g., the intelligent app described in FIGS. 2 to 4) for providing a voice recognition service, and receive a user utterance according to the executed application. The electronic device 501 may transmit the received user utterance to the intelligent server 503 and receive result information for providing a function (or a service) corresponding to the user utterance. The result information may include pieces of information (e.g., a plan) which cause the designated application to perform the function (or the service) corresponding to the user utterance and/or UI/user experience (UX) information for providing a graphical user interface corresponding to the user utterance (or to provide a designated task). The electronic device 501 may be implemented in the same manner as the electronic device 101 described with reference to FIG. 1 above and/or the above-described user terminal 290 described with reference to FIGS. 2 to 4 above, and thus a repeated description of the above-described description will be omitted.

According to various embodiments, the intelligent server 503 may be a server implemented to provide a voice recognition service. As described above, the intelligent server 503 may analyze a user utterance, and provide, according to the result of the analysis, the electronic device 501 with result information (e.g., a plan and UI/UX information) corresponding to the user utterance processed by a designated voice assistant app. For example, the intelligent server 503 may generate the result information corresponding to the user utterance by using the plurality of voice assistant apps. In a case in which a user utterance is received, each of the plurality of voice assistant apps may be an application or a program implemented to return UI/UX information and/or information for performing a function corresponding to the received user utterance. The voice assistant app may be implemented to correspond to a designated application installed in the electronic device 501, and may be implemented to return information for causing the designated application to learn various types of user utterance and perform a function corresponding to the various types of user utterance according to the result of the learning. When the returned information is processed into result information by the intelligent server 503 and transferred to the electronic device 501, the electronic device 501 may provide a function (or a server or a task) corresponding to the result information of the designated application (or corresponding to the user utterance) by using the result information. The voice assistant app may be implemented by a third part and registered in the intelligent server 503. The voice assistant app may be replaced with a domain or a capsule. The voice assistant app is well known in the art, and thus detailed description thereof will be omitted here. The intelligent server 503 may be implemented in the same manner as the intelligent server 200 described with reference to FIGS. 2 to 4 above, and thus repeated description will be omitted.

Hereinafter, an example of respective elements of the electronic device 501 and the intelligent server 503 is described according to various embodiments.

Figure 6A:
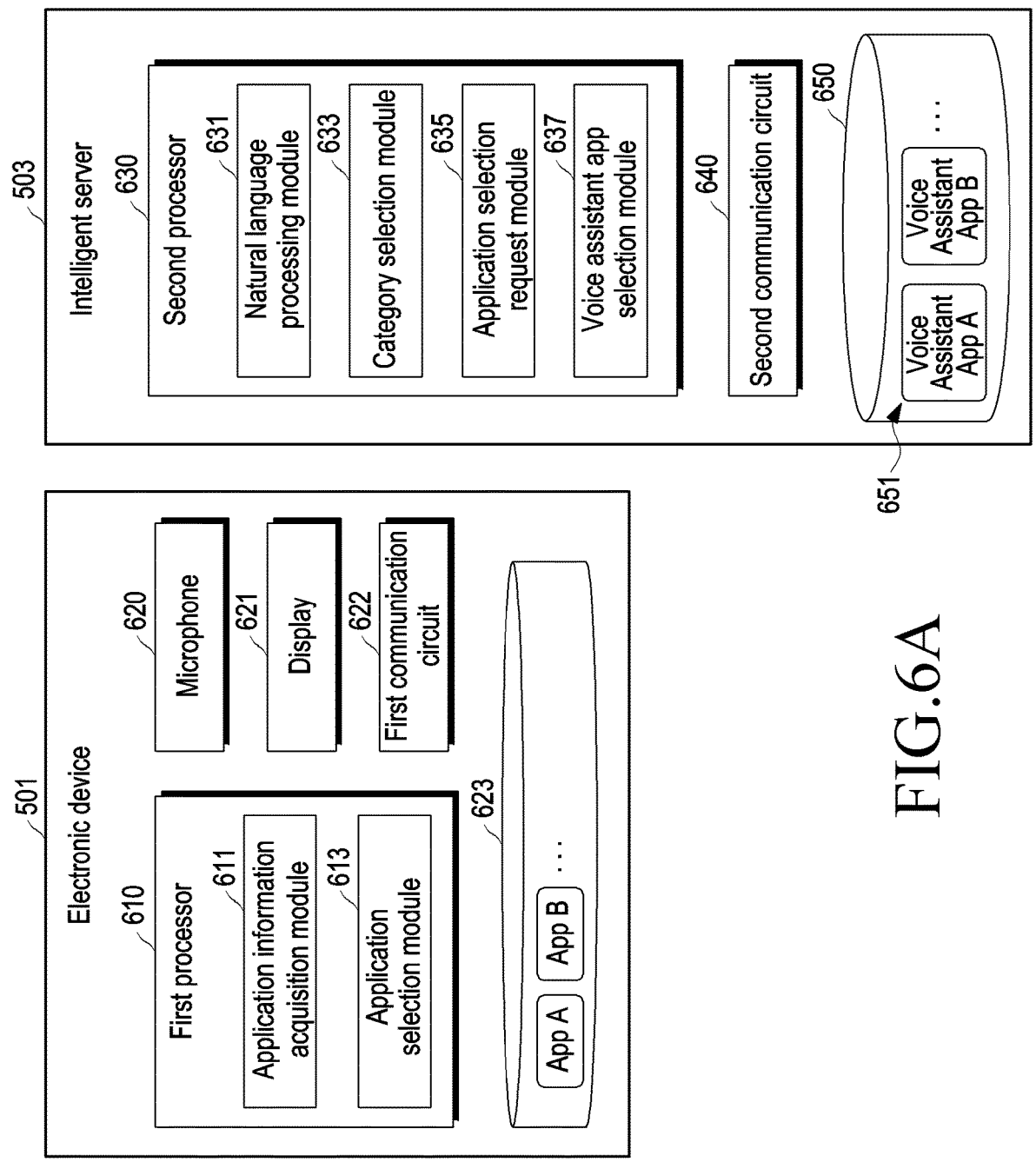
FIG. 6A illustrates an example of respective elements of an electronic device and an intelligent server according to various embodiments.
Figure 6B:
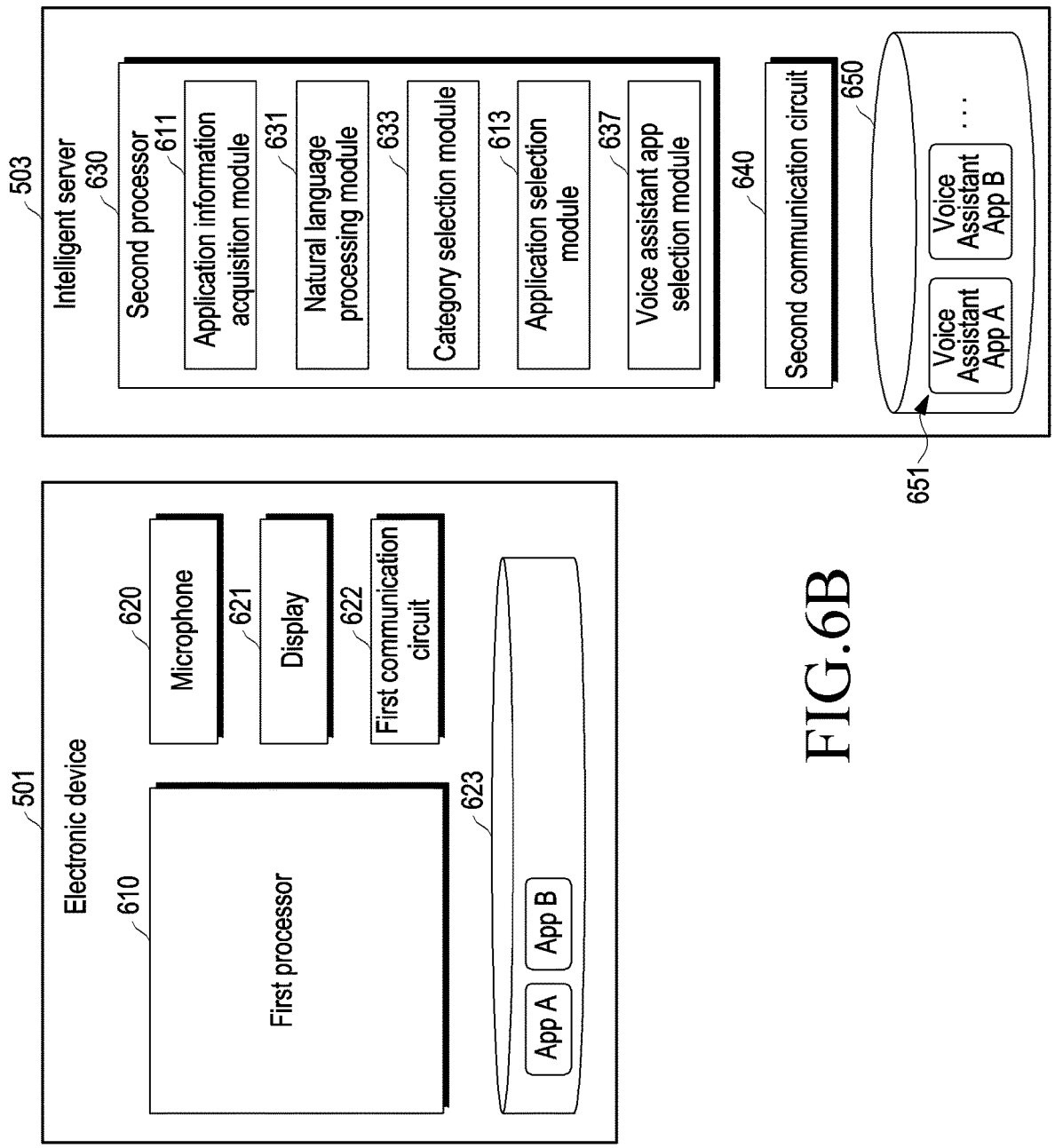
FIG. 6B illustrates another example of respective elements of an electronic device and an intelligent server according to various embodiments.

FIG. 6A illustrates an example of respective elements of the electronic device 501 and the intelligent server 503 according to various embodiments. FIG. 6B illustrates another example of respective elements of the electronic device 501 and the intelligent server 503 according to various embodiments. However, the respective elements of the electronic device 501 and the intelligent server 503 are not limited to elements illustrated in FIGS. 6A and 6B and the electronic device 501 and the intelligent server 503 may be implemented to include more or fewer elements than the number of elements illustrated in FIGS. 6A and 6B. Hereinafter, FIGS. 6A and 6B will be described with reference to FIGS. 7 and 8.

Figure 7:
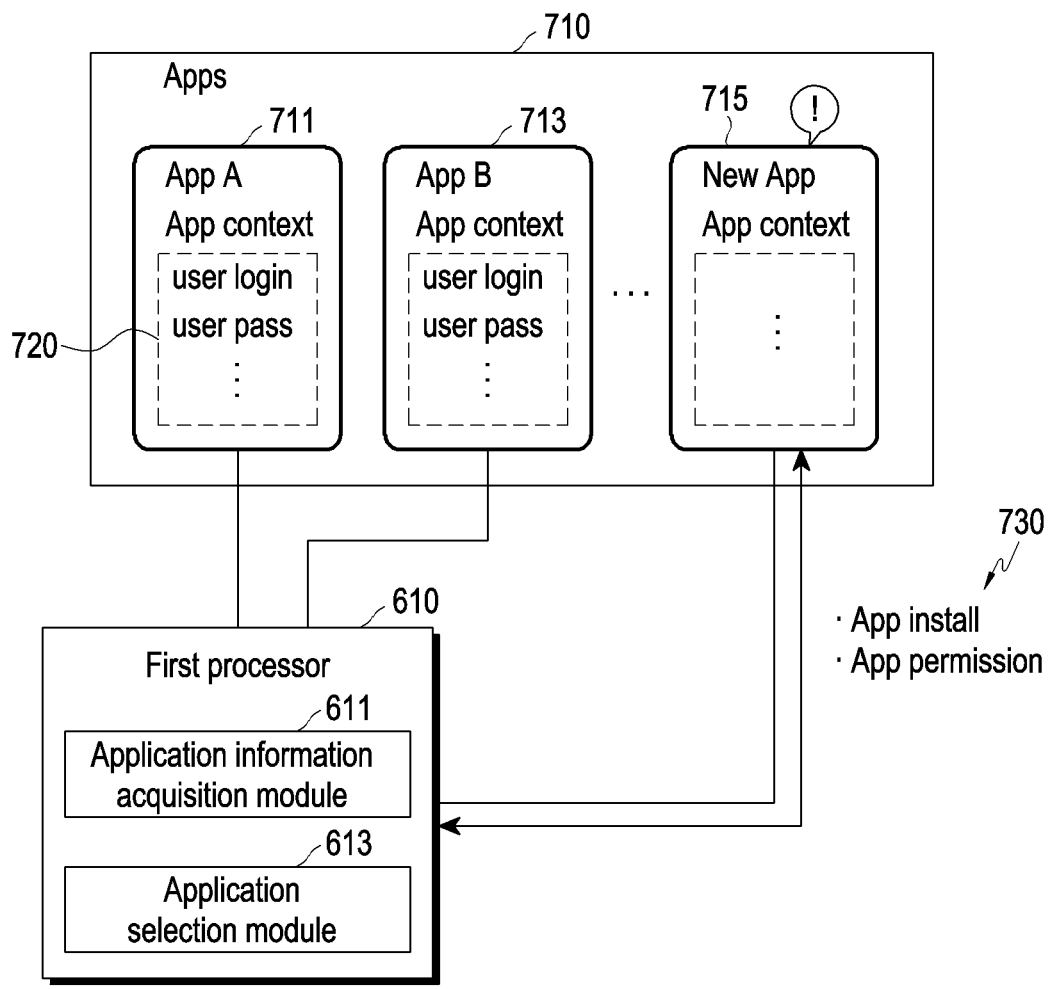
FIG. 7 illustrates an example of the plurality of voice assistant apps classified in units of categories in an intelligent server according to various embodiments.
Figure 8:
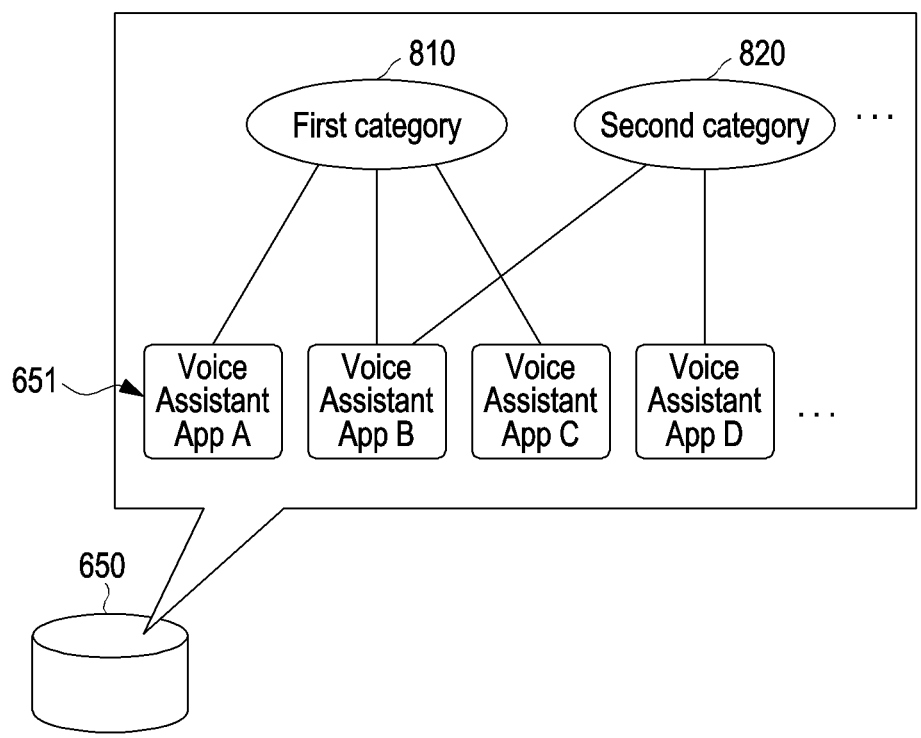
FIG. 8 illustrates an example of an operation of acquiring information associated with applications installed in an electronic device, by an electronic device according to various embodiments.

FIG. 7 illustrates an example of the plurality of voice assistant apps classified in units of categories in the intelligent server 503 according to various embodiments. FIG. 8 illustrates an example of an operation of acquiring information associated with applications installed in the electronic device 501, by the electronic device 501 according to various embodiments.

According to various embodiments, referring to FIG. 6A, the electronic device 501 may include a microphone 620, a display 621, a first communication circuit 622, a memory 623, and a first processor 610 including an application information acquisition module 611 and an application selection module 613, and the intelligent server 503 may include a second communication circuit 640, a database 650, and a second processor 630 including a natural language processing module 631, a category selection module 633, an application selection request module 635, and a voice assistant app selection module 637.

Hereinafter, at least some of modules (e.g., the application information acquisition module 611, the application selection module 613, the natural language processing module 631, the category selection module 633, the application selection request module 635, and the voice assistant app selection module 637) included in a processor (e.g., the first processor 610 or the second processor 630) of the electronic device 501 or the intelligent server 503 may be implemented (for example, executed) by software, firmware, hardware, or a combination of two or more thereof. For example, the modules may be implemented in the form of an application, a program, a computer code, instructions, a routine, or a processor which can be executed by the processor of each of the devices. Accordingly, when the modules are executed by the processor (e.g., the first processor 610 or the second processor 630) of each of the devices, the modules may cause the processor of each of the devices to perform an operation (or a function that can be provided by a module) associated with the module. Alternatively, the modules may be implemented as a part of a designated application. For example, the application information acquisition module 611 and the application selection module 613 may be implemented as a part of the intelligent app described with reference to FIGS. 2 to 4 above. Alternatively, without being limited to the described and/or illustrated example, each of the modules may be implemented by hardware (e.g., a processor or a control circuit) separate from the processor (e.g., the first processor 610 or the second processor 630) of each of the devices.

Without being limited to the described and/or illustrated example, the modules may be implemented in different devices. For example, at least a part of the application information acquisition module 611 or the application selection module 613 of the electronic device 501 may be implemented in the intelligent server 503. On the other hand, in another example, at least a part of the natural language processing module 631, the category selection module 633, the application selection request module 635, or the voice assistance app selection module 637 of the intelligent server 503 may be implemented in the electronic device 501. For example, as shown in FIG. 6B, the application information acquisition module 611 and the application selection module 613 to be described later may be provided in the intelligent server 503. In this case, the intelligent server 503 may receive information (e.g., context information) associated with applications installed in the electronic device 501 from the electronic device 501 by using the application information acquisition module 611, store the same in advance, and then select a voice assistant app by using the application selection module 613 according to the prestored information when a user utterance is received from the electronic device 501 thereafter. In this case, the application selection request module 635 for requesting a selection of an application from the electronic device 501 may not be implanted in the intelligent server 503, but is not limited thereto. In this case, when information (e.g., context information of an application) associated with at least one application is acquired (e.g., when a user makes an utterance, when an application is installed, or periodically), the electronic device 501 may transfer acquired information associated with at least one application to the intelligent server 503. The intelligent server 503 may accumulate information associated with at least one application installed in the electronic device 501, the information being acquired from the electronic device 501, by using the application information acquisition module 611, select one application by using the application selection module 613 according to the accumulated information when result information corresponding to the user utterance is requested by the electronic device 501 later, and select one voice assistant app corresponding to the selected application, among voice assistant apps included in one category, by using the voice assistant app selection module 637. Here, although not shown, the intelligent server 503 may further include a management module which manages an account for each electronic device (or a user terminal) and classifies, for each electronic device according to the account, collected information associated with the application. Accordingly, the intelligent server 503 may perform an operation of identifying an account of the electronic device 501 requesting a service, and selecting a voice assistant app with reference to the accumulated application-associated information corresponding to the identified account.

Hereinafter, an example of elements included in the electronic device 501 is described first according to various embodiments. Without being limited to the illustrated example, the elements of the electronic device 501 may be implemented to further include at least some of the above-described elements of the electronic device 101 of FIG. 1 and/or at least some of the above-described elements of the user terminal 290 of FIGS. 2 to 4.

According to various embodiments, the microphone 620 may receive a sound from the outside of the electronic device 501. For example, the electronic device 501 (e.g., the first processor 610) may operate the microphone 620 to receive a sound generated from the outside, through the microphone 620. The sound generated from the outside may include voices (utterances) of speakers (e.g., a user and/or another speaker (or another person)), residential noises, or ambient (background) noises. In an embodiment, the microphone 620 may include the plurality of microphones 620. The electronic device 501 (e.g., the first processor 610) may generate beamforming for receiving a sound generated in a designated direction, from the electronic device 501 by means of the sound received using the plurality of microphones 620. According to the received sound, the acquired sound in the designated direction may be defined as a sub-sound. The plurality of microphones 620 may be arranged in the electronic device 501 to be spaced apart from each other by a predetermined distance, and the sub-sound may be acquired by signal-processing the sound received through each microphone 620 based on the spaced distance and time or a phase associated with the direction in which the sound is acquired. The beamforming technique is well known in the art, and thus the specific description thereof will be omitted.

According to various embodiments, the display 621 may display various types of contents. The various types of contents may include, but are not limited to, an execution screen of an application (or a program) executed in the electronic device 501, a media content, or an image. As described above, the display 621 may be implemented as a touchscreen. The display 621 may be implemented in the same manner as the display module 160 described with reference to FIG. 1 above, and repeated description will be omitted.

According to various embodiments, the first communication circuit 622 may be communicatively connected to the electronic device 501 and/or the intelligent server 503 in various types of communication schemes to transmit and/or receive data. The communication scheme may include, but is not limited to, the above-described communication scheme of configuring a direction communication connection such as Bluetooth and Wi-Fi direct, and may also include a communication scheme (e.g., Wi-Fi communication) using an access point or a communication scheme (e.g., 3rd generation (3G), 4G/long term evolution (LTE), and 5G) using cellular communication using a base station. The first communication circuit 622 may be implemented in the same manner as the communication module 190 described with reference to FIG. 1 above, and thus repeated description will be omitted.

Hereinafter, an example of modules included in the first processor 610 of the electronic device 601 is described.

According to various embodiments, the application information acquisition module 611 may acquire (or collect) information associated with at least one application installed in the electronic device 501. In an embodiment, the information associated with the at least one application may include context information of the at least one application installed in the electronic device 501. The context information of the at least one application, acquired by the application information acquisition module 611, may be pieces of context information 720 pre-defined (or pre-identified or pre-designated) among various types of context information which can be accumulated (or collected) according to execution (or a lifecycle of a process) of applications 710 (e.g., a first application 711 and a second application 713). As shown in FIG. 7, the pieces of pre-defined context information 720 may include, but are not limited to, at least one of information indicating user login into a designated app (user login), information on a user pass to the designated app (a user pass), information on a supported function (and/or service) (not shown), or information on a right (e.g., right to access location information, right to file editing/recording, or right to make a call/use a network), and various types of context information 720 may be pre-defined. As the context information 720 is pre-defined, the applications 710 installed in the electronic device 501 may collect the pre-defined context information 720 while being executed (or in the middle of the process), and the application information acquisition module 611 may request pieces of pre-defined information from the installed applications 710 to acquire the pre-defined context information 720 that is being collected by the applications 710. Alternatively, without being limited to the described and/or illustrated example, the application information acquisition module 611 may acquire the pieces of pre-defined information from a manager module (not shown) which manages information on installed applications, instead of acquiring the information from the installed applications. In another embodiment, information associated with the at least one application may include information 730 associated with whether the at least one application is installed. As shown in FIG. 7, when a new application 715 is installed in the electronic device 501, the application information acquisition module 611 may acquire information indicating the installation of the application. Accordingly, the application information acquisition module 611 may also acquire information on a list of applications installed in the electronic device 501. The operation of acquiring the information associated with the application by the application information acquisition module 611 may be performed when an application selection request is received from the intelligent server 503, but is not limited thereto, and the operation may be performed in a designated period or performed when an event other than the receiving of the request from the intelligent server 503 occurs (e.g., acquiring information on the right configured for (assigned to) an application or performing the operation at the time of installation of the application). The pieces of context information acquired by the application information acquisition module 611 may be stored in the memory 623.

According to various embodiments, the application selection module 613 may select one application for providing a function corresponding to a received user utterance, from among installed applications according to the context information (e.g., the pieces of pre-defined information) associated with the application acquired (or collected) by the application information acquisition module 611. For example, as described below, the application selection module 613 may receive information on one or more parameters from the intelligent server 503, acquire context information of an application corresponding to the one or more received parameter, and determine whether the acquired context information satisfies a designated condition. The one or more parameters may correspond to information (e.g., a code, text, or a value) for identifying the context information of the application, described in FIG. 7 above, and the electronic device 501 may identify context information of applications corresponding to the one or more parameters as the one or more parameters are transferred to the electronic device 501. The application selection module 613 may select an application having context information satisfying a designated condition, as an application performing a function corresponding to a user utterance. For example, as described in more detail below, condition information and context information to be collected may be determined depending on a function of an application as shown in Table 1 below. Without being limited to the described example, various types of the context information and the condition information may be configured for various types of functions. Hereinafter, for convenience of description, it is described that the application which performs a function corresponds to applications for music reproduction, and the operations of the electronic device 501 and the intelligent server 503 are described with an example of "a function of reproducing part of music", "a function of reproducing an entire part of music", "a function of reproducing favorite music", or "a function of seeing lyrics" as shown in Table 1 below. However, the description below may be also applied to various types of applications and various type of functions. For example, when the application corresponds to a camera application, "an image capturing function" can be provided, and the condition to be satisfied by the context information may be configured to be "whether an app is installed" and "whether there is a right to access a camera device".

TABLE 1

| Function | Context information | Condition information |
|---|---|---|
| Reproduce part of music | Information on whether app is installed | App installed O |
| | Information on whether there is right to access media file | Right assigned O |
| Reproduce entire part of music | Information on whether app is installed | App installation O |
| | Information on whether there is right to access media file | Right assigned O |
| | Information on whether user is logged in | Logged in O |
| | Information on type of pass | First pass (e.g., unlimited pass) or second pass (e.g., streaming pass) |

TABLE 1-continued

| Function | Context information | Condition information |
|---|---|---|
| Download music | Information on whether app is installed | App installed O |
| | Information on whether there is right to access media file | Right assigned O |
| | Information on whether user is logged in | Logged in O |
| | Information on type of pass | First pass (e.g., unlimited pass) or second pass (e.g., streaming pass) |
| Reproduce favorite music | Information on whether app is installed | App installed O |
| | Information on whether there is right to access media file | Right assigned O |
| | Information on whether user is logged in | Logged in O |
| See lyrics | Information on whether app is installed | App installed O |

An operation of selecting an application of the electronic device 501 according to the application selection module 613 will be described with reference to FIGS. 9 to 12.

Hereinafter, an example of elements of the intelligent server 503 is described according to various embodiments. The elements of the intelligent server 503 are not limited to the elements illustrated in FIGS. 6A and 6B, and may include the elements of the intelligent server 200 described with reference to FIGS. 2 to 4 above, and thus repeated description will be omitted.

According to various embodiments, the second communication circuit 640 may be communicatively connected to the electronic device 501 and/or the intelligent server 503 in various types of communication schemes to transmit and/or receive data. The second communication circuit 640 may be implemented in the same manner as the first communication circuit 622, and thus repeated description will be omitted.

Hereinafter, modules included in the second processor 630 of the intelligent server 503 are described.

According to various embodiments, the natural language processing module 631 may be implemented in the same manner as the natural language platform 220 of FIGS. 2 to 4, and may analyze the electronic device 501 and/or a voice received from the electronic device 501 to return result information for providing a voice recognition service.

According to various embodiments, the category selection module 633 may select one category corresponding to a user utterance among categories for classifying the plurality of voice assistant apps. For example, the database 650 of the intelligent server 503 may store the plurality of voice assistant apps 651, and the plurality of stored voice assistant apps 651 may be classified in units of categories (e.g., a first category 810 and a second category 820) as shown in FIG. 8. Alternatively, instead of using the term "category", the term "group" for classifying the plurality of voice assistants may be used. For example, referring to FIG. 8, when the first category 810 is "music", the first category 810 may include voice assistant apps (e.g., the first to the third voice assistant apps (voice assistant app A, voice assistant app B, and voice assistant app C)) corresponding to applications which can provide a "music reproducing function". In another example, one voice assistant app may be classified into two or more categories. In an embodiment, a voice assistant app may be classified into at least one designated category according to a type of an utterance which can be processed by the voice assistant app and/or a function which can be provided by the voice assistant app. In another embodiment, at least one category may be selected by a developer who registers a voice assistant app, and thus the voice assistant app may be classified into the at least one category. For example, referring to FIG. 8, the first category 810 is "music" and the second category 820 is "video", a second voice assistant app (voice assistant app B) corresponding to an application which can perform a "function of reproducing both music and video" may be classified into the first category 810 and the second category 820. The category selection module 633 may select a category corresponding to a user utterance by using metadata (e.g., designated text) that is pre-stored for each of the plurality of categories (e.g., the first category 810 and the second category 820). For example, the intelligent server 503 may store, as the metadata, at least one piece of text that is designated for each of the plurality of categories (e.g., the first category 810 and the second category 820), and the at least one piece of text may include various types of name information. For example, when the first category 810 is music, the pieces of name information may include various types of music title, at least some of lyrics, pieces of name information such as the name of a singer, or various types of names of music output devices. When the user utterance is analyzed by the natural language processing module 631 (e.g., an NLU module 1103), the category selection module 633 may identify metadata (e.g., name information) corresponding to the analyzed user utterance (e.g., intention unit text), among pieces of metadata for each of the plurality of pre-stored categories, and select a category corresponding to the identified metadata.

According to various embodiments, the application selection request module 635 may request, from the electronic device 501, a selection of an application corresponding to a voice assistant app among the plurality of voice assistant apps included in one category. For example, the application selection request module 635 may transmit a request (or instructions) causing the electronic device 501 to select one application together with information on the plurality of voice assistant apps, according to the identification of the plurality of voice assistant apps included in the selected category. The information on the plurality of voice assistant apps may include, but are not limited to, identification information (e.g., package information) on the plurality of applications corresponding to the plurality of voice assistant apps and/or information on one or more parameters associated with performance of a function corresponding to a user utterance (e.g., one or more parameters and conditions), and further include various types of information (e.g., information on the selected category, information for identifying an application version (e.g., an app min version), or a link for installing an application). According to the transmission of the information, the intelligent server 503 may receive information on the selected application, from the electronic device 501.

According to various embodiments, the voice assistant app selection module 637 may select a voice assistant app corresponding to an application received from the electronic device 501, from among the plurality of voice assistant apps included in the selected category. The selected voice assistant app may process the user utterance and return result information (e.g., a pass or a UI/UX).

Hereinafter, an example of operations of the electronic device 501 and the intelligent server 503 is described according to various embodiments.

According to various embodiments, the intelligent server 503 may transmit information on the plurality of voice assistant apps included in a category corresponding to a received user utterance to the electronic device 501, and identify, according to the transmission, one voice assistant app for processing the user utterance, among the plurality of voice assistant apps by using application information received to the electronic device 501.

Figure 9:
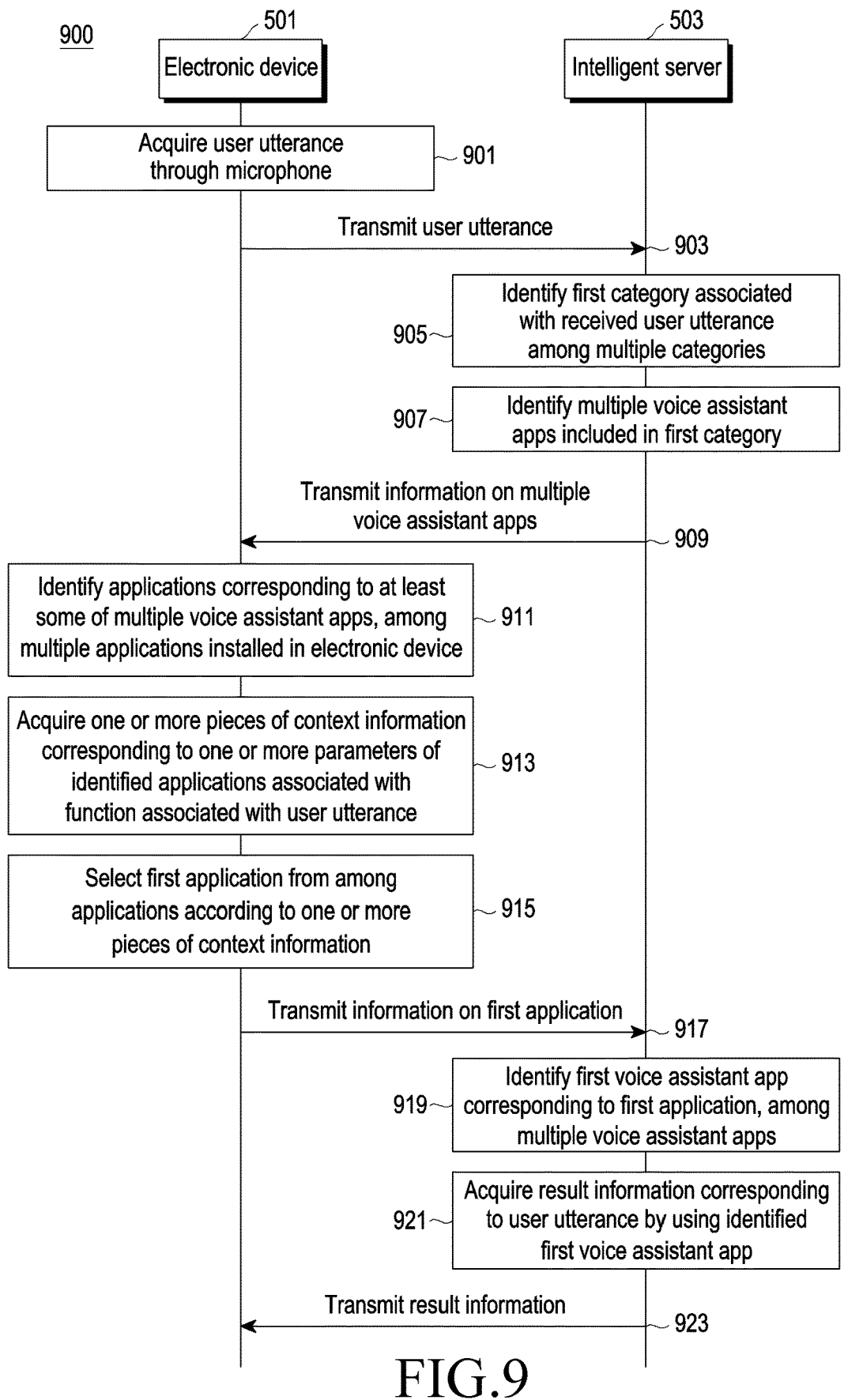
FIG. 9 is a flow chart illustrating an example of an operation of an electronic device according to various embodiments.

FIG. 9 is a flowchart 900 illustrating an example of an operation of the electronic device 501 according to various embodiments. Operations illustrated in FIG. 9 may be performed in various sequences, but are not limited to the illustrated sequence. In addition, according to various embodiments, more or fewer operations may be performed than the number of the operations illustrated in FIG. 9. Hereinafter, FIG. 9 is described with reference to FIGS. 10, 11A, 11B, and 12.

Figure 10:
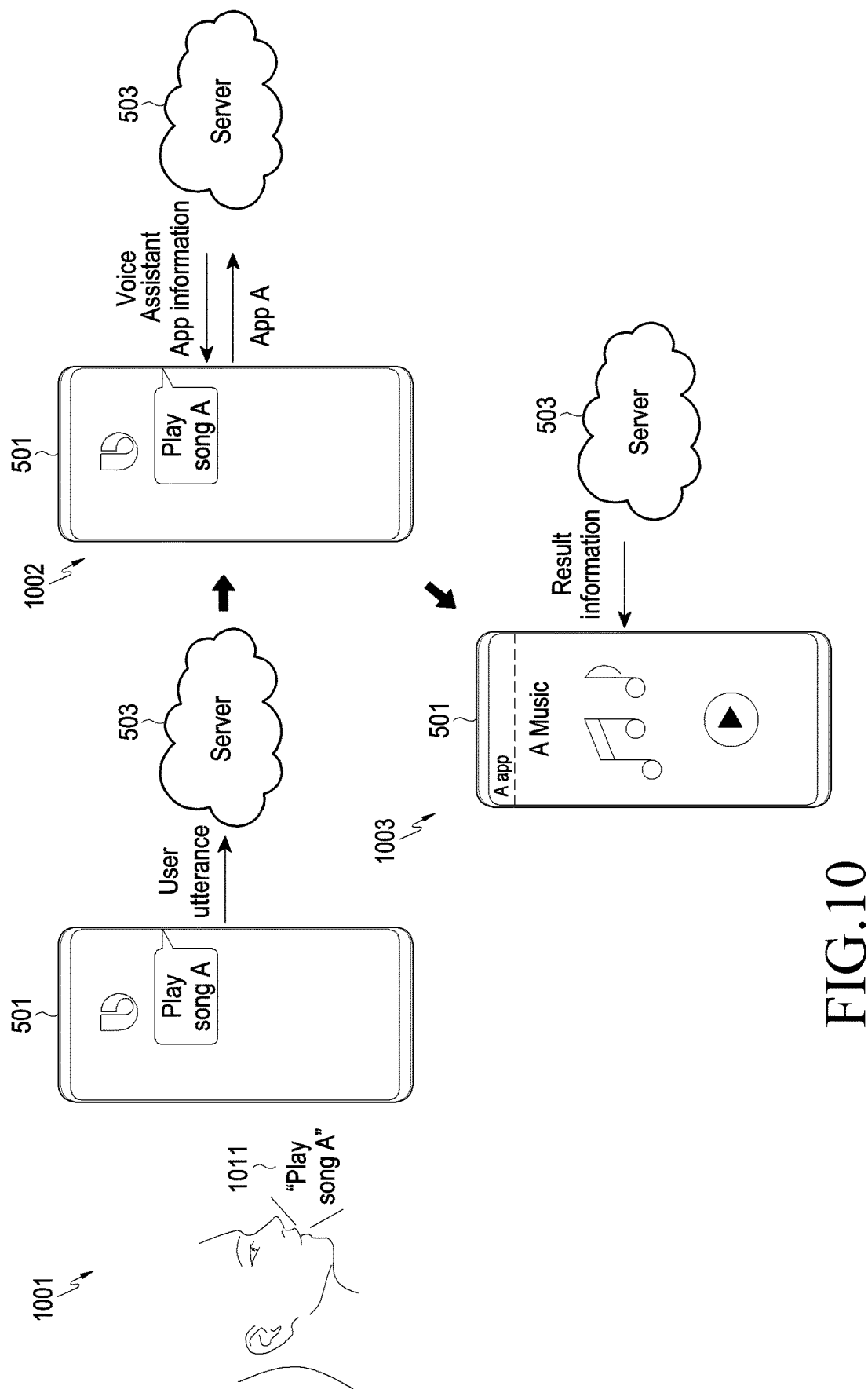
FIG. 10 illustrates an example of operations of an electronic device and an intelligent server according to various embodiments.
Figure 11A:
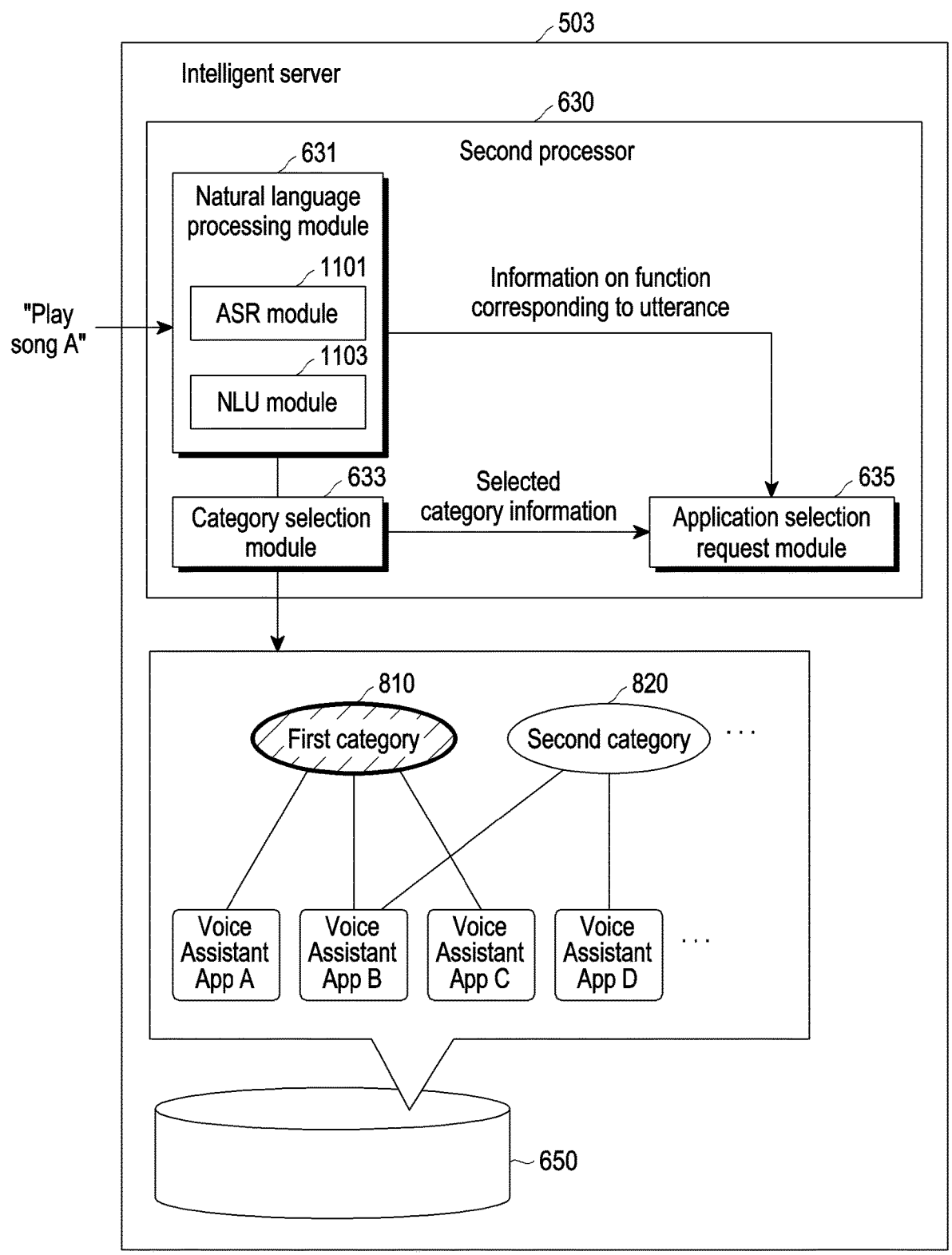
FIG. 11A illustrates an example of an operation of selecting a category by an intelligent server according to various embodiments.
Figure 11B:
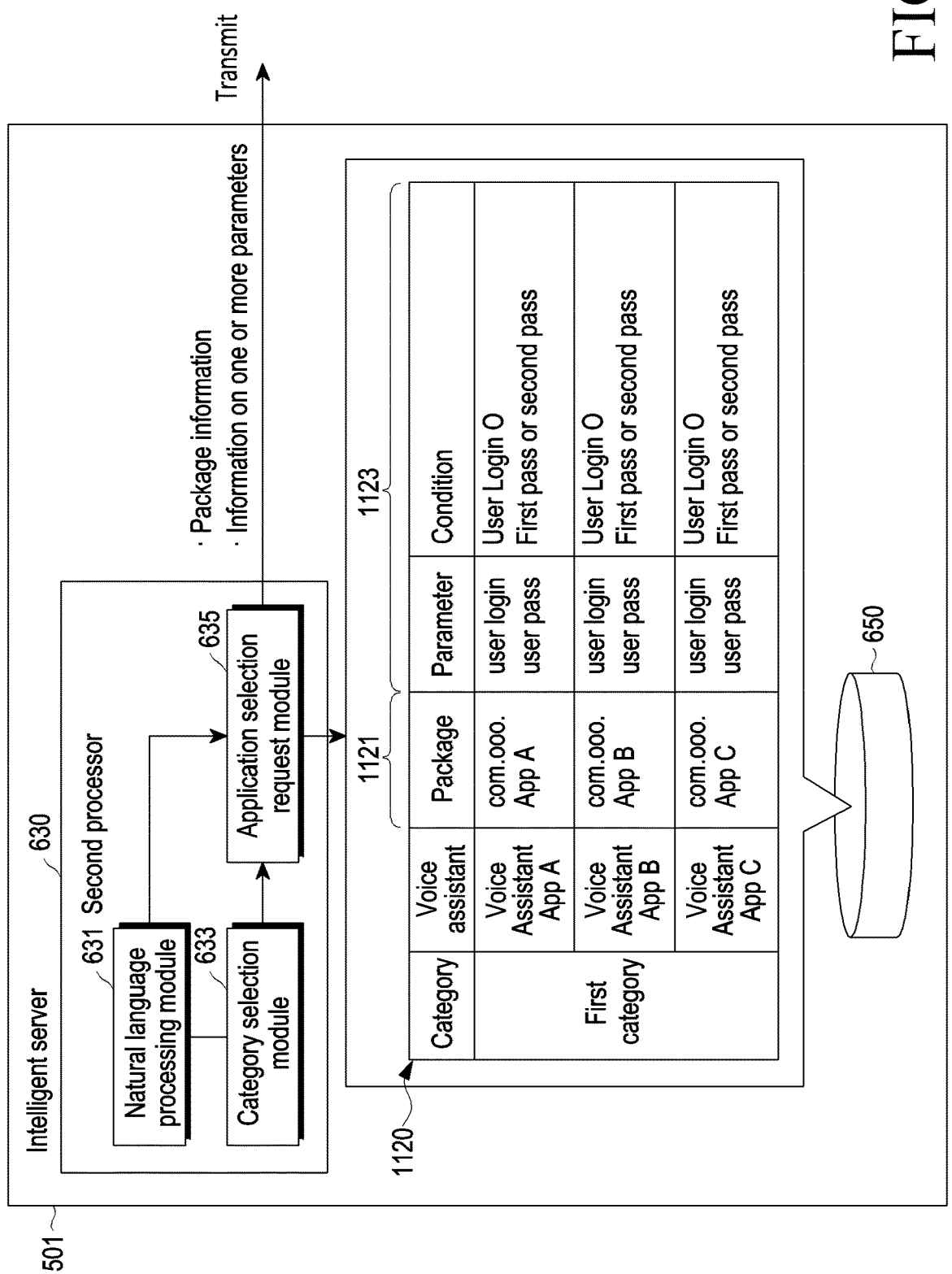
FIG. 11B illustrates an example of an operation of acquiring information on voice assistant apps included in a selected category by an intelligent server according to various embodiments.
Figure 12:
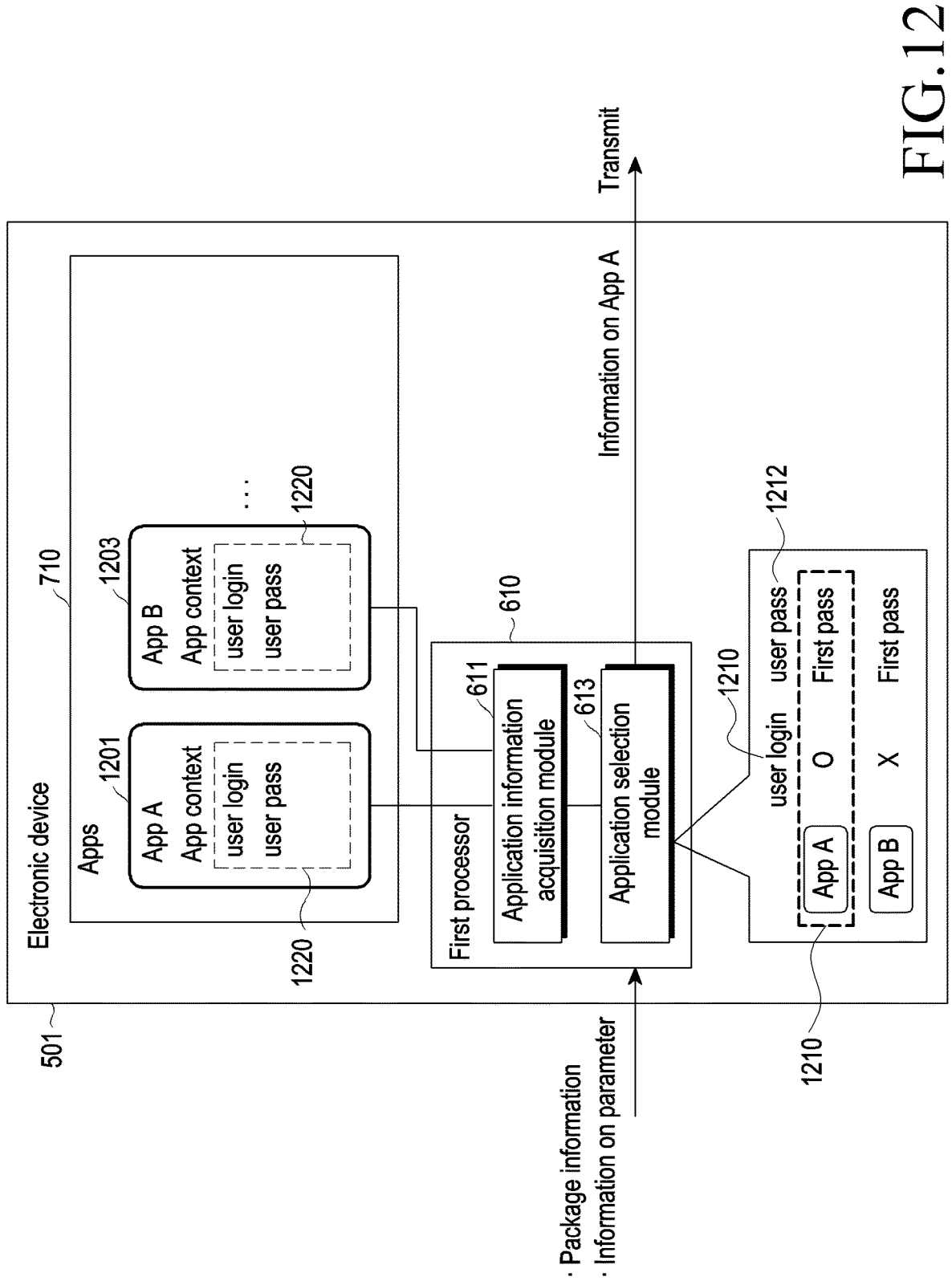
FIG. 12 illustrates an example of an operation of selecting an application by an electronic device according to various embodiments.

FIG. 10 illustrates an example of operations of the electronic device 501 and the intelligent server 503 according to various embodiments. FIG. 11A illustrates an example of an operation of selecting a category by the intelligent server 503 according to various embodiments. FIG. 11B illustrates an example of an operation of acquiring information on voice assistant apps included in the selected category by the intelligent server 503 according to various embodiments. FIG. 12 illustrates an example of an operation of selecting an application by the electronic device 501 according to various embodiments.

According to various embodiments, the electronic device 501 may acquire a user utterance through a microphone 620 in operation 901, and may transmit the user utterance to the intelligent server 503 in operation 903. For example, as shown in 1001 in FIG. 10, the electronic device 501 may acquire a user utterance 1011 (e.g., "Play song A") through the microphone 620 according to execution of an application (e.g., the intelligent app described in FIGS. 2 to 4 above) for providing a voice recognition service. As described above, the intelligent app may be executed when a designated voice input, an input through a hardware key, or selection of an icon corresponding to the intelligent app is received. The electronic device 501 may transmit the acquired user utterance 1011 to the intelligent server 503 according to the executed application. When the user utterance 1011 is transmitted to the intelligent server 503, it may be understood that digital information corresponding to analog waveforms of the user utterance 1011 is transmitted to the intelligent server 503. Alternatively, as described above, a part (e.g., an ASR module 1101 and an NLU module 1103) of the natural language processing module 631 provided in the intelligent server 503 may be implemented in the electronic device 501, and the electronic device 501 may analyze the user utterance by using the part of the natural language processing module 631 and transmit the analyzed information to the intelligent server 503.

According to various embodiments, the intelligent server 503 may identify a first category 810 associated with the received user utterance, among the plurality of categories in operation 905, and may identify the plurality of voice assistant apps included in the first category 810 in operation 907. For example, as shown in FIG. 11A, the intelligent server 503 may select one category (e.g., the first category 810) among the plurality of categories (e.g., the first category 810 and the second category 820) into which voice assistant apps (voice assistant app A, voice assistant app B, voice assistant app C, and voice assistant app D) are classified, according to the analysis of the received user utterance 1011. The intelligent server 503 (e.g., the natural language processing module 631) may convert the received user utterance into text by using the ASR module 1101 and analyze the converted text by using the NLU module 1103 to acquire information on the user utterance 1011. The information on the user utterance 1011 acquired according to the analysis may include at least one piece of information (e.g., intent) indicating the intention of the user utterance 1011, information on a word included in the utterance (e.g., a song title or a device name), or information on the capability. For example, the intelligent server 503 may acquire text of "song A" as information on the user utterance 1011. As described above, the intelligent server 503 (e.g., the category selection module 633) may compare metadata for each of the pre-stored the plurality of categories with information on the acquired user utterance 1011, and may identify, according to the result of the comparison, a category (e.g., the first category 810) corresponding to the information on the user utterance, among the plurality of categories (e.g., the first category 810 and the second category 820) as shown in FIG. 11A. For example, the intelligent server 503 (e.g., the category selection module 633) may select the first category (e.g., "music") having metadata corresponding to "song A" from among the plurality of categories. The intelligent server 503 may identify a voice assistant app included in the selected category (e.g., the first category 810) and identify that the selected category includes the plurality of voice assistant apps (voice assistant app A, voice assistant app B, and voice assistant app C).

According to various embodiments, the intelligent server 503 may transmit information on the plurality of voice assistant app in operation 909. For example, the intelligent server 503 (e.g., the application selection request module 635) may acquire information on the selected category (e.g., the first category 810) as shown in FIG. 11A, and may acquire information 1120 on the plurality of voice assistant apps included in the selected category (e.g., the first category 810) from the database 650 according to the acquired information as shown in FIG. 11B. For example, the information 1120 on the plurality of voice assistant apps may include identification information (e.g., package information 1121) of applications (e.g., App A, App B, and App C) corresponding to the plurality of voice assistant apps (e.g., voice assistant app A, voice assistant app B, and voice assistant app C) included in the selected category (e.g., the first category 810), one or more parameters associated with performance of a function corresponding to the user utterance, and condition information corresponding to the one or more parameters (e.g., a condition (or a code, text, and a value) to be satisfied by context information of an application corresponding to a parameter for performing a function), as shown in 1123 of FIG. 11B. In addition, without being limited to the described example, the information 1120 on the plurality of voice assistant apps may further include various types of information (e.g., information on the selected category, information on identifying an application version (e.g., an app min version), or a link for installing an application). In an embodiment, as the one or more parameters are transferred to the electronic device 501 as information (e.g., a code, text, and a value) for identifying context information of the application described in FIG. 7, the electronic device 501 may identify the context information of applications corresponding to the one or more parameters. For example, as shown in FIG. 11B, the one or more parameters may include text (e.g., user login) indicating application context information relating to whether the user is logged in, and may include text (e.g., a user pass) indicating application context information relating to the type of the user pass. In addition, in an embodiment, the condition information corresponding to the one or more parameters may be information on the condition to be satisfied by the context information corresponding to the one or more parameters. For example, as shown in FIG. 11B, the condition information corresponding to the one or more parameters may include information on a first condition indicating that the application context information relating to whether the user is logged in, which corresponds to the "user login", needs to indicate that the user has been logged in, and information on a second condition indicating that the application context information of the type of the user pass, which corresponds to the "user pass", needs to be a first pass (an unlimited pass) or a second pass (a streaming pass). For example, the information on the condition may include information that needs to be satisfied by the context information. In this case, the information to be satisfied may be managed by a designated value or text. For example, the information on the first information may include a designated value (e.g., 1) as information indicating that the user has been logged in. Accordingly, in a case in which the electronic device 501 identifies first context information corresponding to the user login, when the identified first context information is a designated value (e.g., 1) corresponding to the information on the first condition, it may be identified that the first context information satisfies the first condition (or an application satisfies the first condition). In another example, the information on the second condition may include designated first text (e.g., A) indicating a first pass (an unlimited pass) and designated second text (e.g., B) indicating a second pass (a streaming pass). Accordingly, in a case in which the electronic device 501 identifies the second context information corresponding to the user pass, when the identified second context information is designated first text or second text (e.g., A or B) corresponding to information on the second condition, it may be identified that the second condition is satisfied (e.g., an application satisfies the second condition). The condition information is not limited thereto and may be implemented in various forms. The intelligent server 503 (e.g., the application selection request module 635) may transmit information on the identified voice assistant apps to the electronic device 501 as shown in 1002 of FIG. 10. In this case, the intelligent server 503 (e.g., the application selection request module 635) may transmit a request (e.g., an instruction) for requesting a selection of an application together so that an operation of selecting an application is to be performed by using information on the plurality of voice assistant apps, received from the electronic device 501. Hereinafter, the one or more parameters and the condition information on the at one or more parameters are described in more detail.

According to various embodiments, one or more parameters and condition information 1123 corresponding to the one or more parameters may be associated with performance of a function corresponding to a user utterance 1011. For example, when the function corresponding to the user utterance 1011 is "reproducing a song", applications corresponding to identified voice assistant apps may perform the function of reproducing an entire part of music when a user is logged in and the type of a user pass is a first pass (an unlimited pass) or a second pass (a streaming pass). In another example, when the function corresponding to the user utterance 1011 is "downloading a song", the function of downloading a song may be performed when the user is logged in and the type of the user pass is the first pass (the unlimited pass). In other words, when one or more pieces of context information corresponding to one or more parameters associated with a designated function satisfy the condition information, the application may perform the designated function. Accordingly, as described below, the intelligent server 503 may classify parameter information and information to be satisfied by a parameter according to a function, pre-store the same, and acquire, from the pre-stored information, one or more parameters corresponding to a function corresponding to the received user utterance 1011 and information on a condition to be satisfied by the one or more parameters. In an embodiment, the information on the function may be identified according to the intention corresponding to a user utterance 1011, which is obtained by the analysis of the user utterance 1011 by the natural language processing module 631. For example, the natural language processing module 631 may determine the intention as "music reproducing" according to the result of analysis of the user utterance 1011 (e.g., "Play song A"), and identify a "music reproducing function" corresponding to the determined intention. Alternatively, without being limited thereto, the intelligent server 503 may classify a parameter and information on a condition to be satisfied by the parameter in units of intentions, instead of units of functions corresponding to the user utterance 1011, and pre-store the same. In this case, the intelligent server 503 may transfer the intention analyzed by the natural language processing module 631, instead of the function, to the application selection request module 635 to acquire information on voice assistant applications corresponding to the analyzed intention. The intelligent server 503 may identify one or more parameters associated with the performance of the identified function (e.g., the music reproducing function) and condition information corresponding to the one or more parameters. For example, as shown in Table 1 above, with respect to a "function of reproducing an entire part of music", the intelligent server 503 may acquire: a first parameter (e.g., user login) and information (e.g., a user is logged in) on a first condition to be satisfied by first context information (e.g., context information indicating user login) corresponding to the first parameter; and a second parameter (e.g., a user pass) and information (e.g., a first pass (e.g., an unlimited pass) or a second pass (e.g., a streaming pass)) on a second condition to be satisfied by second context information (e.g., context information indicating the type of a user pass) corresponding to the second parameter. Alternatively, without being limited thereto, the intelligent server 503 may classify a parameter and information on a condition to be satisfied by the context information corresponding to the parameter in units of intentions, instead of units of functions corresponding to the user utterance, and pre-store the same. In this case, the intelligent server 503 may transfer the intention analyzed by the natural language processing module 631, instead of the function, to the application selection request module 635 to acquire information on voice assistant applications corresponding to the analyzed intention.

According to various embodiments, when a single voice assistant app is included in a selected category, the intelligent server 503 may process a user utterance by using the single voice assistant app and transmit acquired result information to the electronic device 501.

According to various embodiments, in operation 911, the electronic device 501 may identify applications corresponding to at least some of the voice assistant apps among the plurality of applications installed in the electronic device 501. For example, as shown in FIG. 12, the electronic device 501 (e.g., the application information acquisition module 611) may identify applications (e.g., a first application 1201 (e.g., App A) and second application 1203 (e.g., App B)) corresponding to the plurality of pieces of identification information (e.g., pieces of package information 1121)

included in information 1120 on the plurality of assistant apps received from the intelligent server 503, among the plurality of applications 710 installed in the electronic device 501. The electronic device 501 may identify the number of applications corresponding to (e.g. same as) the number (e.g., three) of the plurality of pieces of identification information. However, as shown in FIG. 12, when a designated application (e.g., a third application corresponding to a third voice assistant app (voice assistant app C)) is not installed, the electronic device 501 may identify a smaller number (e.g., two) of applications (e.g., a first application 1201 (e.g., App A) and a second application 1203 (e.g., App B)) than the number of the plurality of pieces of identification information.

According to various embodiments, the electronic device 501 may identify whether the number of applications corresponding to the plurality of pieces of identification information (e.g., the pieces of package information) 1121 is greater than one. When the number of identified applications is greater than one, the electronic device 501 may continue to perform operation 913, and when the number of identified applications is one, the electronic device 501 may transmit information on the identified application to the intelligent server 503.

According to various embodiments, in operation 913, the electronic device 501 may acquire one or more pieces of context information corresponding to one or more parameters of the identified applications associated with the function corresponding to the user utterance. For example, as shown in FIG. 12, the electronic device 501 (e.g., the application information acquisition module 611) may acquire context information of identification applications (e.g., a first application (App A) and a second application (App B)), which correspond to information on one or more parameters 1211 and 1212 included in the plurality of voice assistant apps, received from the intelligent server 503. In an embodiment, the electronic device 501 may request context information 1220 corresponding to the one or more parameters 1211 and 1212 from the application, and receive the requested context information 1220 from the application. For example, the electronic device 501 (e.g., the application information acquisition module 611) may request first context information corresponding to a first parameter 1211 (e.g., user login) and second context information corresponding to a second parameter 1212 (e.g., a user pass) from applications (e.g., a first application and a second application), respectively, and receive first context information indicating whether a user is logged in and second context information indicating the type of a user pass. As described with reference to FIG. 7 above, applications (e.g., the first application 1201 and the second application 1203) installed in the electronic device 501 may acquire (or collect) pre-defined context information 1220 and return context information 1220 which is requested by the application information acquisition module 611. In another embodiment, the electronic device 501 may identify one or more pieces of context information 1220 corresponding to one or more received parameters 1211 and 1212 among pieces of context information acquired and stored in advance.

According to various embodiments, the electronic device 501 may select a first application from among the applications by using the one of more pieces of context information in operation 915, and may transmit information on the first application to the intelligent server 503 in operation 917. For example, the electronic device 501 (e.g., the application selection module 613) may identify whether the one or more pieces of context information acquired from the applications (e.g., the first application and the second application) satisfy a condition by using condition information corresponding to one or more parameters, which is included in the information on the plurality of voice assistant apps, received from the intelligent server 503. For example, as shown in FIG. 12, with respect to the first application, when first context information, which corresponds to a first parameter (e.g., a user login) and is used to indicate whether a user is logged in, indicates that a user is logged in (e.g., when the first context information corresponds to a code, a value, or text indicating that the user is logged in), the electronic device 501 (e.g., the application selection module 613) may identify satisfaction of a first condition, and when second context information, which corresponds to a second parameter (e.g., a user pass) and is used to indicate the type of a user pass, corresponds to a designated pass (e.g., a first pass (an unlimited pass) or a second pass (a streaming pass)) (e.g., when the second context information corresponds to a code, a value, or text indicating a first pass (an unlimited pass) or a second pass (a streaming pass)), the electronic device 501 (e.g., the application selection module 613) may identify satisfaction of a second condition, according to the received condition information. In another example, as shown in FIG. 12, with respect to the second application, when first context information indicates that the user is not logged in (e.g., when the first context information corresponds to a code, a value, or text indicating that the user is not logged in), the electronic device 501 (e.g., the application selection module 613) may identify dissatisfaction of a first condition, and when second context information indicates a designated pass (e.g., a first pass (an unlimited pass) or a second pass (a streaming pass)), the electronic device 501 (e.g., the application selection module 613) may identify dissatisfaction of a second condition, according to the received condition information.

According to various embodiments, the electronic device 501 (e.g., the application selection module 613) may select (operation 1210) one application (e.g., a first application) from among applications according to the operation of identifying whether the condition is satisfied. In an embodiment, the electronic device 501 may identify one application having pieces of context information satisfying the greatest number of conditions, among applications. For example, as shown in FIG. 12, in another example, the electronic device 501 may identify one application having pieces of context information satisfying all conditions, among applications. The electronic device 501 may transmit information on the selected application (e.g., the first application) to the intelligent server 503.

According to various embodiments, when the plurality of applications are identified according to the result of the identification, the electronic device 501 may display information on the identified applications and receive a selection of one application from a user.

According to various embodiments, the intelligent server 503 may identify a first voice assistant app corresponding to a first application among the plurality of voice assistant apps in operation 919, acquire result information corresponding to the user utterance by using the identified voice assistant app in operation 921, and transmit the result information to the electronic device 501 in operation 923. For example, the intelligent server 503 may identify a first voice assistant app corresponding to the selected first application and transfer the user utterance to the identified first voice assistant app so as to process the user utterance. The intelligent server 503 may acquire information returning from the voice assistant app and acquire result information including information (e.g. a pass) causing the first application to perform at least one function (e.g., "reproducing song A") corresponding to the user utterance by using the acquired information and/or UI/UX information. As illustrated in 1003 of FIG. 10, the intelligent server 503 may transmit the acquired result information to the electronic device 501, and the electronic device 501 may allow the first application (e.g., App A) to perform the at least one function (e.g., "reproducing song A") by using the result information.

Hereinafter, an example of operations of the electronic device 501 and the intelligent server 503 is described according to various embodiments.

According to various embodiments, the intelligent server 503 may transmit one or more parameters corresponding to a function corresponding to a received user utterance and condition information, among the plurality of parameters and pieces of condition information, to the electronic device, and may receive information on one application according to the transmission.

Figure 13:
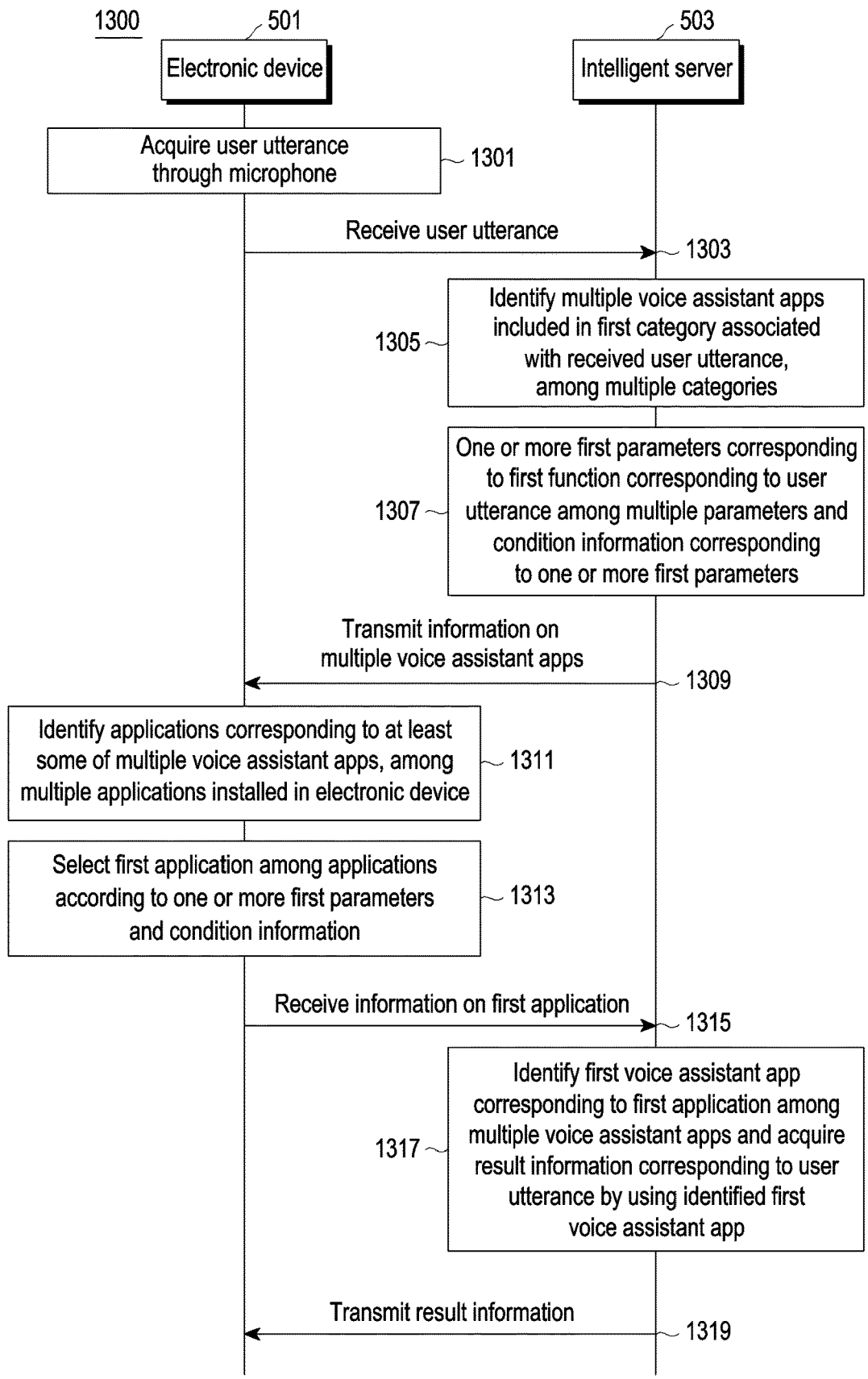
FIG. 13 is a flow chart illustrating an example of an operation of an electronic device according to various embodiments.

FIG. 13 is a flowchart 1300 illustrating an example of an operation of the electronic device 501 according to various embodiments. Operations illustrated in FIG. 13 may be performed in various sequences, but are not limited to the illustrated sequence. In addition, according to various embodiments, more or fewer operations may be performed than the number of operations illustrated in FIG. 13. Hereinafter, FIG. 13 is described with reference to FIGS. 14, 15A, and 15B.

Figure 14:
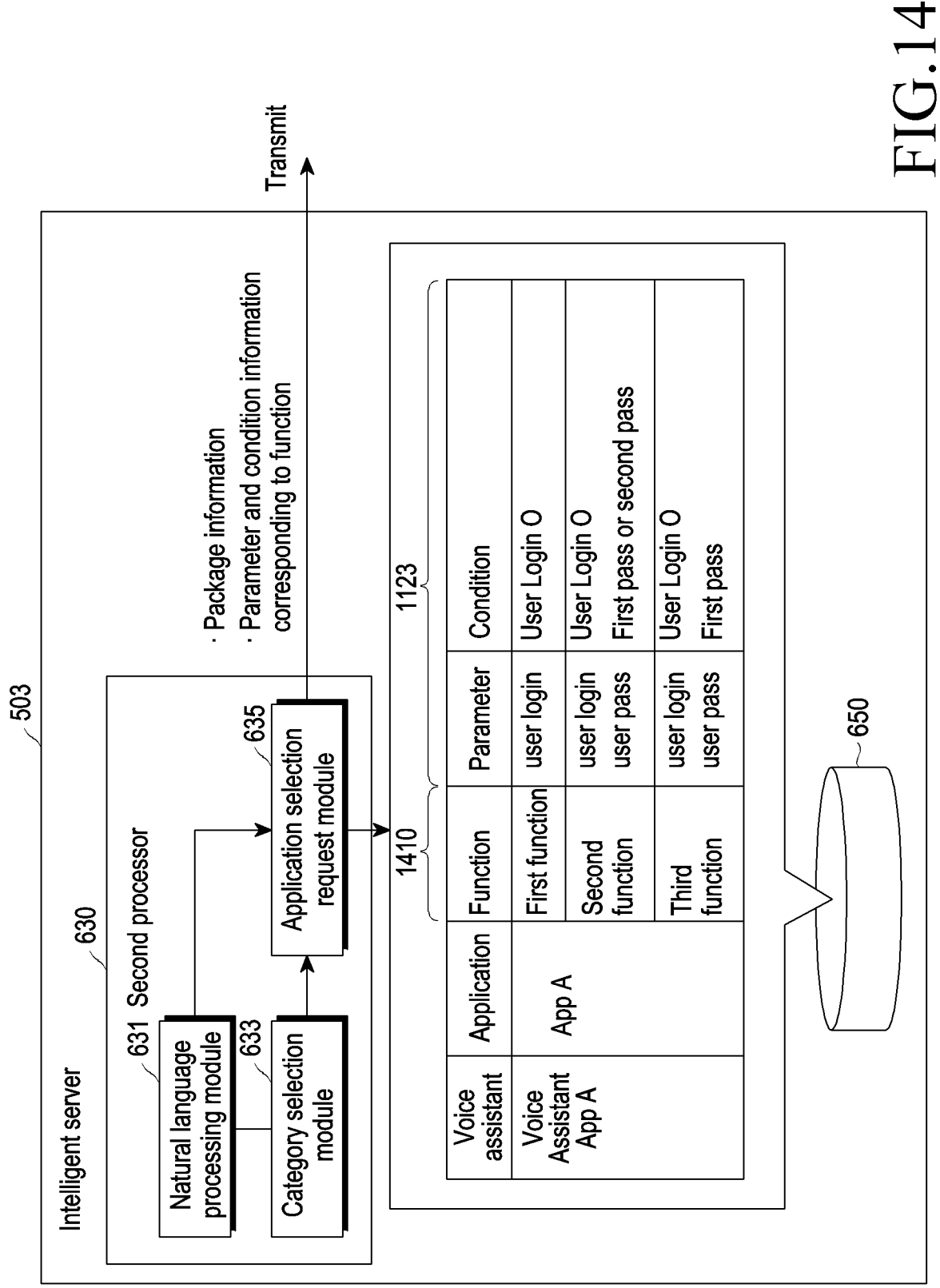
FIG. 14 illustrates an example of an operation of acquiring one or more parameters associated with a function corresponding to a user utterance and condition information corresponding to the one or more parameters, and the intelligent server according to various embodiments.
Figure 15A:
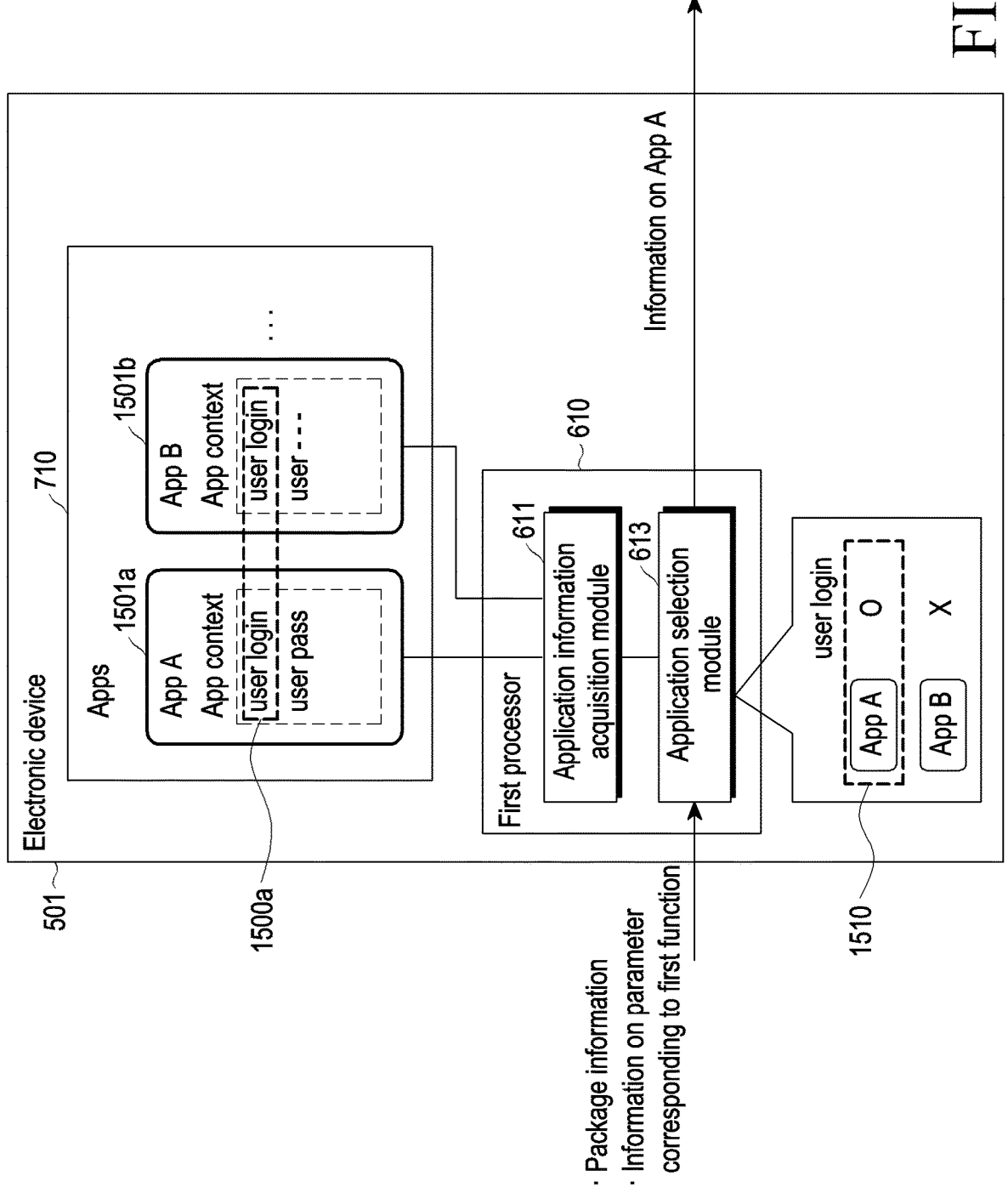
FIG. 15A illustrates an example of an operation of selecting an application by an electronic device according to various embodiments.
Figure 15B:
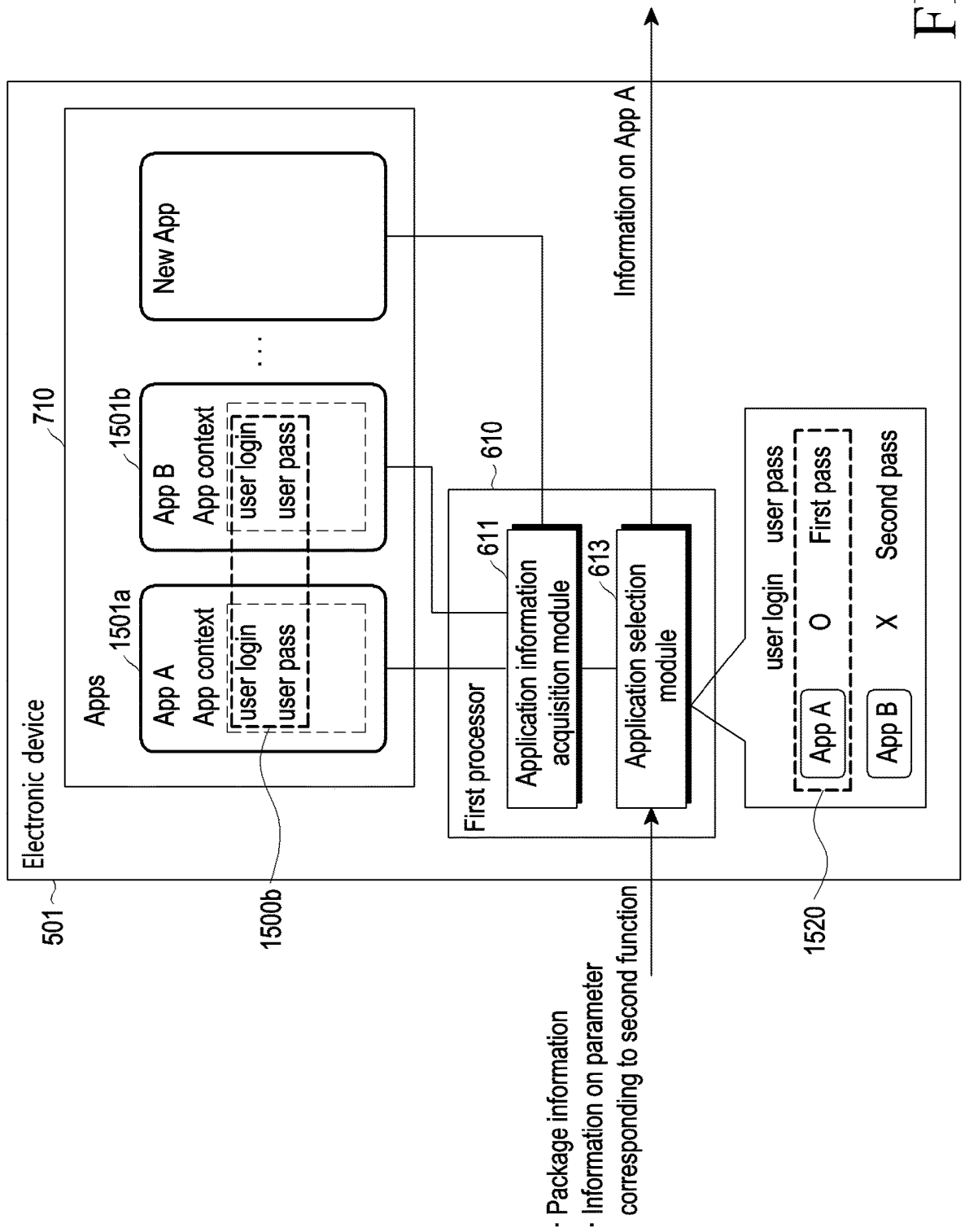
FIG. 15B illustrates an example of an operation of selecting an application by an electronic device according to various embodiments.

FIG. 14 illustrates an example of an operation of acquiring one or more parameters associated with a function corresponding to a user utterance and condition information corresponding to the one or more parameters, by the intelligent server 503 according to various embodiments. FIG. 15A illustrates an example of an operation of selecting an application by the electronic device 501 according to various embodiments. FIG. 15B illustrates an example of an operation of selecting an application by the electronic device 501 according to various embodiments.

According to various embodiments, the electronic device 501 may acquire a user utterance through a microphone 620 in operation 1301, and transmit the user utterance to the intelligent server 503 in operation 1303. For example, the electronic device 501 may acquire a user utterance (e.g., "Play song A") through the microphone 620 according to the execution of an application (e.g., the intelligent app described in FIGS. 2 to 4 above) for providing a voice recognition service. The electronic device 501 may transmit the acquired user utterance to the intelligent server 503 according to the executed application. Operations 1301 and 1303 of the electronic device 501 may be performed in the same manner as operations 901 and 903 of the electronic device 501, and thus repeated description will be omitted.

According to various embodiments, in operation 1305, the intelligent server 503 may identify the plurality of voice assistant apps included in a first category 810 associated with the received user utterance, from the plurality of categories. The intelligent server 503 may select one category from among the plurality of categories into which voice assistant apps are classified, according to analysis of the received user utterance, and identify the plurality of voice assistant apps included in the selected category. Operation 1305 of the intelligent server 503 may be performed in the same manner as operations 905 to 907 of the intelligent server 503, and thus repeated description will be omitted.

According to various embodiments, the intelligent server 503 may identify one or more first parameters corresponding to a first function corresponding to the user utterance, among the plurality of parameters and information on conditions corresponding to the one or more first parameters in operation 1307, and transmit information on the plurality of voice assistant apps in operation 1309. For example, the intelligent server 503 (e.g., the application selection request module 635) may identify (or acquire or select) a parameter and condition information corresponding to a function corresponding to the currently received user utterance among one or more parameters according to the plurality of functions of the plurality of voice assistant apps corresponding to the selected category and condition information corresponding to the one or more parameters according to the plurality of functions. For example, as shown in FIG. 14, the intelligent server 503 (e.g., the application selection request module 635) may acquire one or more parameters and condition information 1123 according to the plurality of functions 1410 (e.g., a first function, a second function, and a third function) for a first voice assistant app (voice assistant app A) included in a first category 810. The same parameter may be implemented for each of the plurality of functions 1410, but condition information 1123 to be satisfied by context information corresponding to a parameter may be different according to each of the functions 1410. In an embodiment, the first voice assistant app may correspond to a music reproducing application (App A), the first function may be a "pre-listening" function, a parameter corresponding to the first function may be a first parameter (e.g., a user login) indicating first context information on the user login, and information on the first condition may be indication of the user login by the first context information. In another embodiment, the second function may be a "music reproducing (or streaming)" function, a parameter corresponding to the second function may be a first parameter (e.g., user login) indicating first context information on the user login and a second parameter (e.g., a user pass) indicating second context information on the type of the user pass, and information on the second condition may be indication of the user login by the first context information and indication of a first pass (e.g., an unlimited pass) or a second pass (e.g., a streaming pass) by the second context information. In another embodiment, the third function may be a "music downloading" function, a parameter corresponding to the third function may be a first parameter (e.g., user login) indicating first context information on the user login and a second parameter (e.g., a user pass) indicating second context information on the type of the user pass, and information on the second condition may be indication of the user login by the first context information and indication of a first pass (e.g., an unlimited pass) by the second context information. The intelligent server 503 (e.g., the application selection request module 635) may acquire information on the first parameter and the first condition when the function corresponding to the current received user utterance is the first function, and may acquire information on the first parameter, the second parameter, and the second condition when the function corresponding to the user utterance is the second function. Operations 1307 to 1309 of the intelligent server 503 may be performed in the same manner as operation 909 of the intelligent server 503, and thus repeated description will be omitted.

According to various embodiments, in operation 1311, the electronic device 501 may identify applications corresponding to at least some of the plurality of voice assistant apps, among the plurality of applications installed in the electronic device 501. For example, the electronic device 501 may identify applications corresponding to pieces of received identification information (e.g., pieces of package information) among the plurality of applications installed in the electronic device 501. Operation 1311 of the electronic device 501 may be performed in the same manner as operation 911 of the electronic device 501, and thus repeated description will be omitted.

According to various embodiments, the electronic device 501 may select a first application among the applications by using one or more first parameters and information on conditions corresponding to the one or more first parameters in operation 1313, and transmit information on the first application in operation 1315. The electronic device 501 may acquire one or more pieces of context information associated with one or more parameters corresponding to the function corresponding to the received user utterance of each of the identified applications, and determine whether the acquired one or more pieces of context information satisfy a condition corresponding to the function corresponding to the user utterance. For example, as shown in FIG. 15A, the electronic device 501 may acquire (operation 1500*a*) first context information corresponding to a first parameter (e.g., user login) corresponding to a first function (e.g., a function of pre-listening) of identified applications (e.g., a first application 1501*a* (e.g., App A) and a second application 1501*b* (e.g., App B)), and determine whether the acquired first context information satisfies a first condition (e.g., determine whether the acquired first context information corresponds to a code, text, or a value indicating the user login). In another example, as shown in FIG. 15B, the electronic device 501 may acquire (operation 1500*b*) first context information corresponding to a first parameter (e.g., user login) corresponding to a second function (e.g., music reproducing (streaming)) of the identified applications (e.g., the first application 1501*a* (e.g., App A) and the second application 1501*b* (e.g., App B)) and second context information corresponding to a second parameter (e.g., a user pass), determine whether the context information satisfies a first condition (e.g., whether the context information corresponds to a code, text, or a value indicting the user login), and determine whether the second context information satisfies a second condition (e.g., whether the second context information corresponds to a code, text, or a value indicating a first pass (an unlimited pass) or a second pass (a streaming pass)). According to the result of the determination, the electronic device 501 may select (operation 1510 or 1520) one application (e.g., the first application (App A)) from among the identified applications, and transmit information on the selected application to the intelligent server 503. For example, the electronic device 501 may select an application having context information satisfying the greatest number of conditions or all conditions. Operations 1313 to 1315 of the electronic device 501 may be performed in the same manner as operations 913 to 917, and thus repeated description will be omitted.

According to various embodiments, the intelligent server 503 may identify a first voice assistant app corresponding to a first application from among the plurality of voice assistant apps and acquire result information corresponding to the user utterance by using the identified first voice assistant app in operation 1317, and may transmit the result information to the electronic device 501 in operation 1319. Operations 1317 to 1319 of the intelligent server 503 may be performed in the same manner as operations 919 to 923 of the intelligent server 503, and thus repeated description will be omitted.

Hereinafter, an example of operations of the electronic device 501 and the intelligent server 503 is described according to various embodiments.

According to various embodiments, when two or more applications are selected according to determination on whether context information of applications satisfies a condition, the intelligent server 503 may further identify additional information and select one application by using the identified additional information from among the two or more selected applications. In an embodiment, the additional information may include information indicating whether a selection is made by a user.

Figure 16:
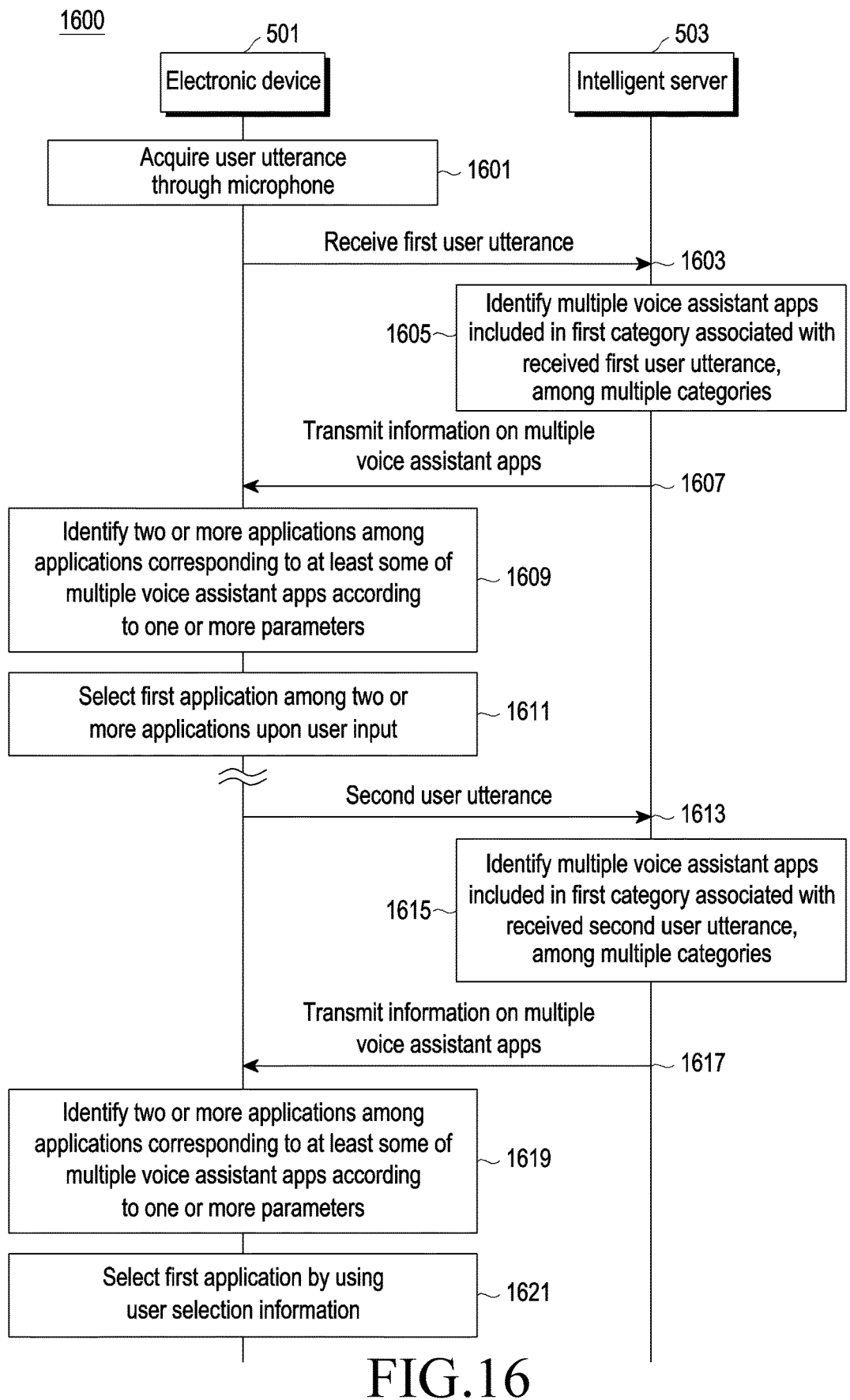
FIG. 16 a flow chart illustrating an example of an operation of an electronic device according to various embodiments.

FIG. 16 is a flowchart 1600 illustrating an example of an operation of the electronic device 501 according to various embodiments. Operations illustrated in FIG. 16 may be performed in various sequences, but are not limited to the illustrated sequence. In addition, according to various embodiments, more or fewer operations may be performed than the number of operations illustrated in FIG. 16. Hereinafter, FIG. 16 is described with reference to FIGS. 17, 18A, and 18B.

Figure 17:
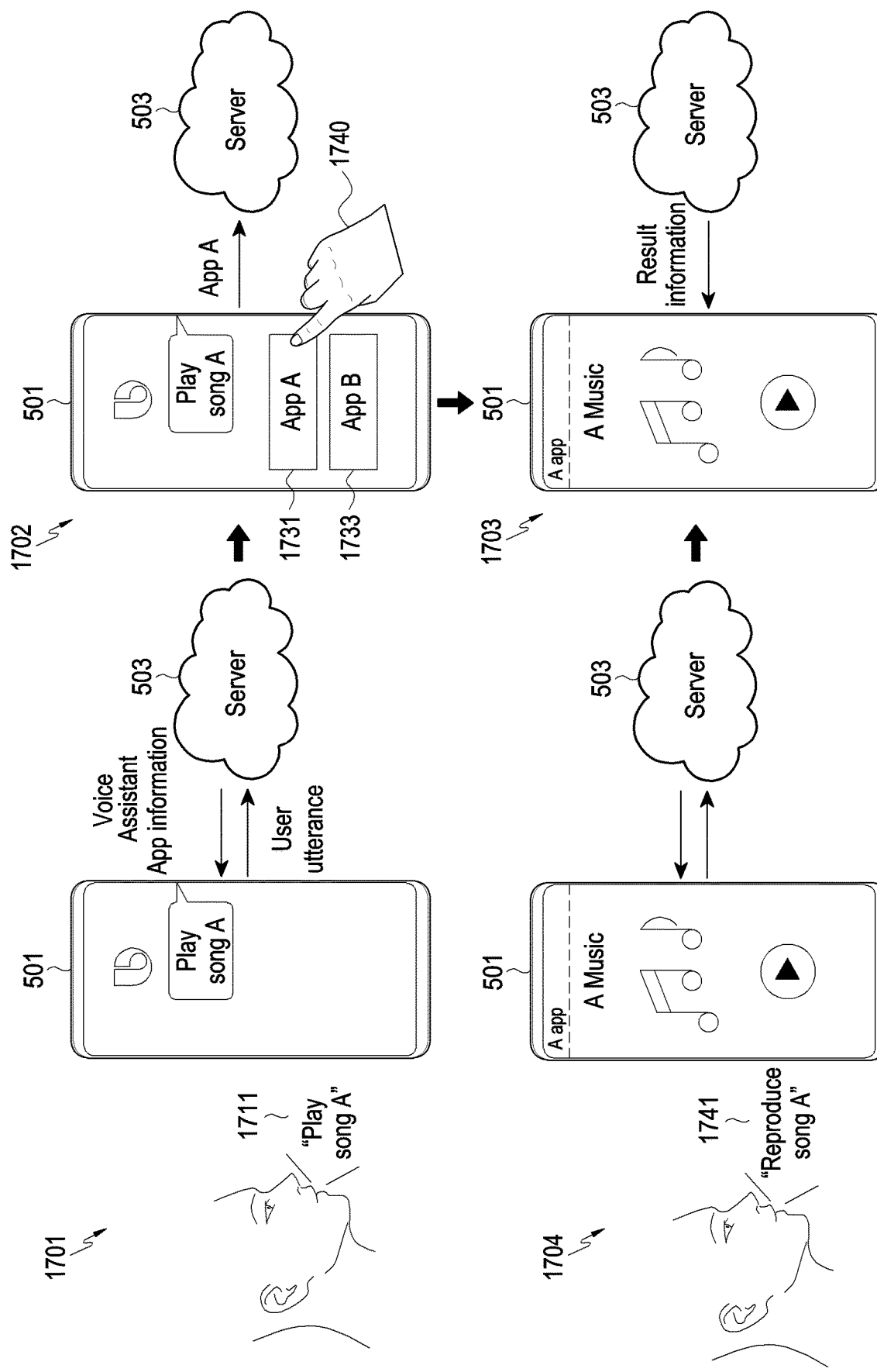
FIG. 17 illustrates an example of operations of an electronic device and an intelligent server according to various embodiments.
Figure 18A:
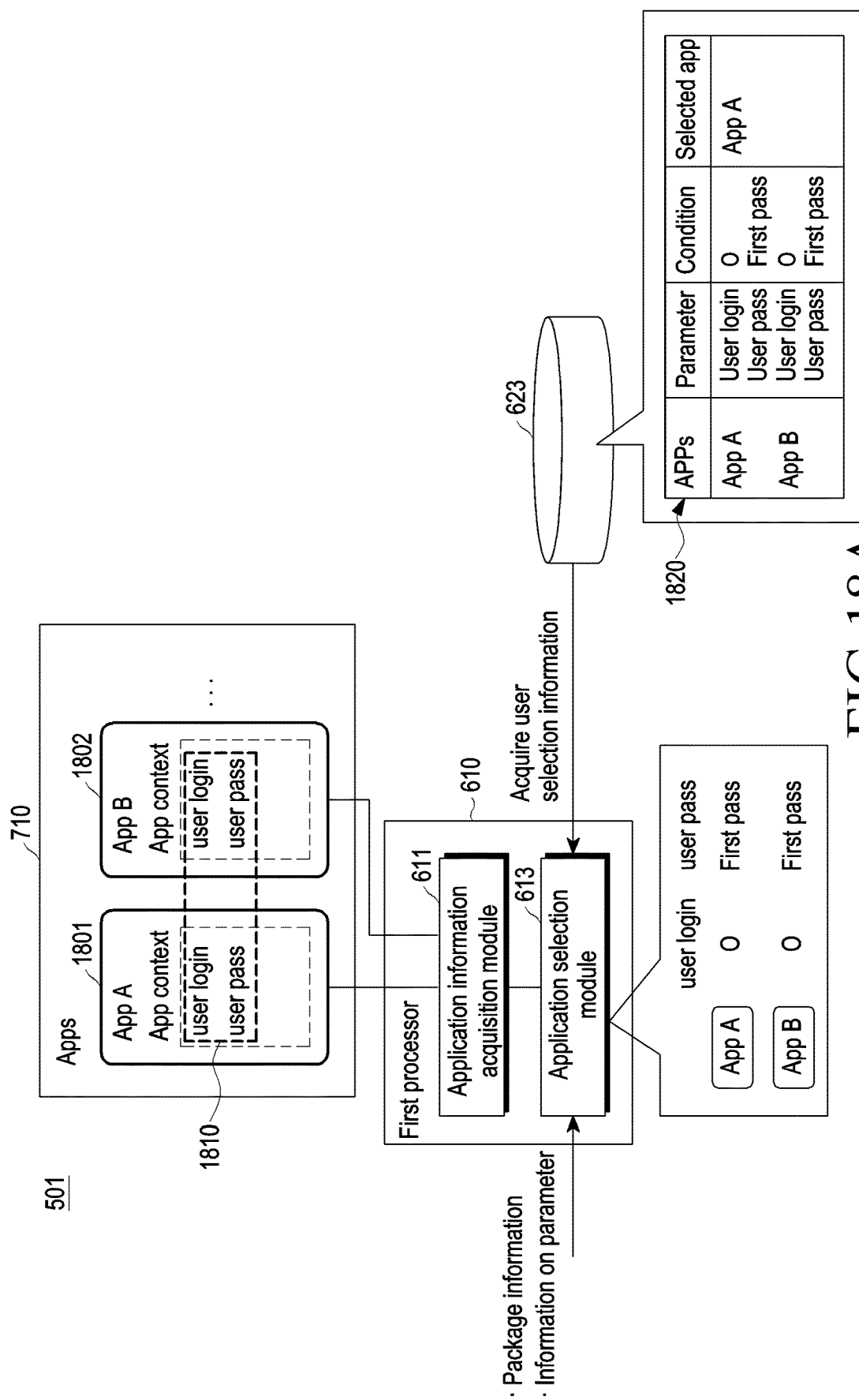
FIG. 18A illustrates an example of an operation of selecting an application by an electronic device according to various embodiments.
Figure 18B:
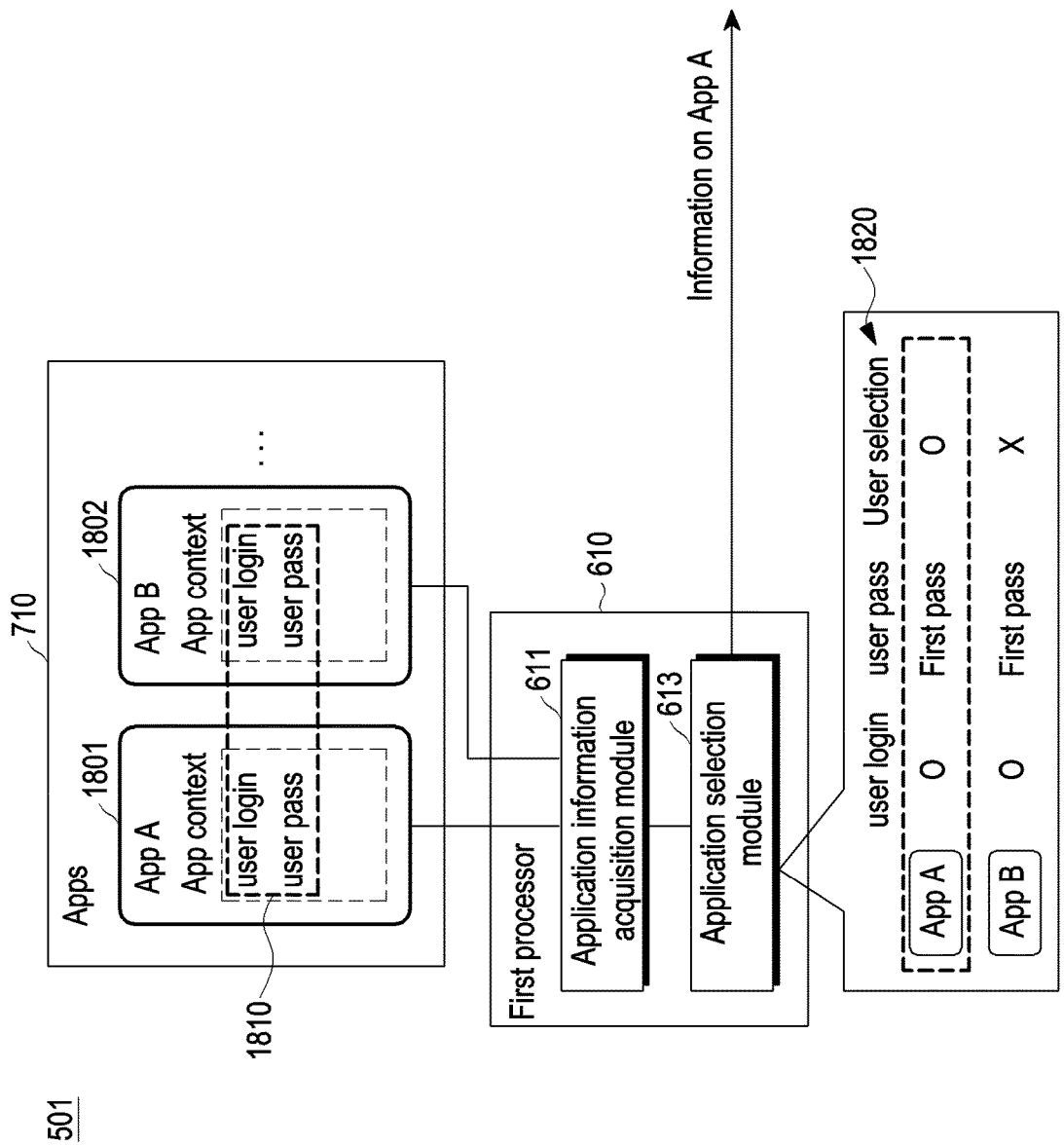
FIG. 18B illustrates an example of an operation of selecting an application by an electronic device by using information indicating a selection of a user according to various embodiments.

FIG. 17 illustrates an example of operations of the electronic device 501 and the intelligent server 503 according to various embodiments. FIG. 18A illustrates an example of an operation of selecting an application by the electronic device 501 according to various embodiments. FIG. 18B illustrates an example of an operation of selecting an application by the electronic device 501 by using information indicating a selection of a user according to various embodiments.

According to various embodiments, the electronic device 501 may acquire a user utterance through the microphone 620 in operation 1601, and transmit a first user utterance to the intelligent server 503 in operation 1603. For example, as shown in 1701 of FIG. 17, the electronic device 501 may acquire a first user utterance 1711 (e.g., "Play song A") through the microphone 620 according to execution of an application (e.g., the intelligent app described with reference to FIGS. 2 to 4 above) for providing a voice recognition service. The electronic device 501 may transmit the acquired first user utterance 1711 to the intelligent server 503 according to the executed application. Operations 1601 and 1603 of the electronic device 501 may be performed in the same manner as operations 901 and 903 of the electronic device 501, and thus repeated description will be omitted.

According to various embodiments, the intelligent server 503 may identify the plurality of voice assistant apps included in a first category 810 associated with a received first user utterance, among the plurality of categories in operation 1605, and transmit information on the plurality of voice assistant apps in operation 1607. For example, the intelligent server 503 may select a category (e.g., "music") according to analysis of the first user utterance (e.g., "Play song A") and acquire information on the plurality of voice assistant apps included in the selected category. For example, information on the plurality of voice assistant apps may include identification information (e.g., package information) on the plurality of voice assistant apps included in the selected category, one or more parameters associated with the execution of the function corresponding to the first user utterance 1711, and condition information corresponding to the one or more parameters (e.g., a condition (or a code, text, or a value) to be satisfied by context information of an application corresponding to a parameter for performing a function). Operations 1605 to 1607 of the intelligent server 503 may be performed in the same manner as operations 905 to 909 and operations 1305 to 1309, and thus repeated description will be omitted.

According to various embodiments, the electronic device 501 may identify two or more applications among applications corresponding to at least some of the plurality of voice assistant apps in operation 1609, and select a first application from among the two or more applications according to a user input in operation 1611. For example, the electronic device 501 may select two or more applications (e.g., a first application 1801 (e.g., App A) and a second application 1802 (e.g., App B)) from among installed the plurality of applications according to the received information on the plurality of voice assistant apps. For example, the electronic device 501 may identify applications corresponding to pieces of identification information (e.g., pieces of package information), among the plurality of applications installed in the electronic device 501. The electronic device 501 may acquire (operation 1810) one or more pieces of context information corresponding to one or more parameters of respective identified applications (e.g., the first application 1801 (e.g., App A) and the second application 1802 (e.g., App B)) by using information on the one or more parameters included in the received information (e.g., information on the plurality of voice assistant apps), and determine whether the acquired one or more pieces of context information satisfy a condition. The electronic device 501 may identify, according to the determination operation, two or more applications (e.g., the first application 1801 (e.g., App A) and the second application 1802 (e.g., App B)) having the same number of pieces of context information satisfying the greatest number of conditions or context information satisfying all conditions. As shown in 1702 of FIG. 17, the electronic device 501 may display information on the identified two or more applications 1731 and 1733 (e.g., the first application 1801 (e.g., App A) and the second application 1802 (e.g., App B)), and select one application 1731 (e.g., the first application (e.g., App A)) from among the two or more applications according to a user's selection 1740 (e.g., a user's touch or a user's voice input). The intelligent server 503 may receive information on the selected application 1731 (e.g., the first application 1801 (e.g., App A)) from the electronic device 501, and transmit result information acquired by processing the first user utterance 1711 by using a voice assistant app corresponding to the selected application, to the electronic device 501. As shown in 1703 of FIG. 17, the electronic device 501 may control the first application to perform a function (e.g., a function of reproducing song A) corresponding to the first user utterance 1711 by using the result information.

According to various embodiments, referring to FIG. 18A, the electronic device 501 may manage information 1820 on the user's selection by storing the same in the memory 623. For example, when the user selects one application, the electronic device 501 may acquire two or more applications provided for the user, pieces of context information of the two or more applications, and information on the application selected by the user among the two or more applications, as information on the user's selection, and store the same. The stored information may be transferred to the intelligent server 503 and managed by the intelligent server 503.

According to various embodiments, the electronic device 501 may transmit a second user utterance to the intelligent server 503 in operation 1613. For example, once information on the user's selection is acquired, the electronic device 501 may receive the second user utterance 1741 (e.g., "reproducing song A") from the user and transmit the received second user utterance 1741 to the intelligent server 503, as shown in 1704 of FIG. 17. For example, the second user utterance 1741 may be an utterance having a function (or intention) corresponding to a function (or intention) associated with the previously received first user utterance 1711. For example, when the first user utterance 1711 is "Play song A", the second user utterance 1741 may be "Play song A", which is the same as the first user utterance 1711, or "Reproduce song A", which is similar to the first user utterance, and the function may be "reproducing song A", which is a function corresponding to the first user utterance 1711 and the second user utterance 1741.

According to various embodiments, the intelligent server 503 may identify the plurality of voice assistant apps included in the first category 810 associated with the received second user utterance, among the plurality of categories in operation 1615, and transmit information on the plurality of voice assistant apps to the electronic device 501 in operation 1617. For example, the intelligent server 503 may select a category (e.g., "music") according to analysis of the second user utterance 1741 (e.g., "Play song A" or "Reproduce song A"), and acquire information on the plurality of voice assistant apps included in the selected category. For example, the information on the plurality of voice assistant apps may include identification information (e.g., package information) on the plurality of voice assistant apps include in the selected category, one or more parameters associated with execution of a function corresponding to the user utterance, and condition information corresponding to the one or more parameters (e.g., a condition (or a code, text, or a value) to be satisfied by context information on an application corresponding to a parameter for performing a function). When the function corresponding to the first user utterance 1711 corresponds to the function corresponding to the second user utterance 1741, information on the plurality of voice assistant apps corresponding to the second user utterance 1741 transmitted to the electronic device 501 in operation 1617 may be identical to (or may correspond to) information on the plurality of voice assistant apps corresponding to the first user utterance 1711 transmitted in operation 1607. Operations 1605 to 1607 of the intelligent server 503 may be performed in the same manner as operations 905 to 909 and operations 1305 to 1309, and thus repeated description will be omitted.

According to various embodiments, the electronic device 501 may identify two or more applications among applications corresponding to at least some of the plurality of assistant apps, according to one or more parameters in operation 1619, and select one first application by using information on a user's selection in operation 1621. For example, as shown in FIG. 18A, the electronic device 501 may select two or more applications (e.g., the first application 1801 (e.g., App A) and the second application 1802 (e.g., App B)) from among the installed the plurality of applications by using information (e.g., pieces of package information and information on the one or more parameters) on the received the plurality of voice assistant apps. The operation of selecting the two or more applications (e.g., the first application 1801 (e.g., App A) and the second application 1802 (e.g., App B)) may be performed according to an operation of comparing the context information with the condition as described above, and thus repeated description will be omitted. When the two or more applications (e.g., the first application 1801 (e.g., App A) and the second application 1802 (e.g., App B)) are selected, the electronic device 501 may determine whether there is information corresponding (or identical) to the information on the two or more selected applications, among the pre-stored information on the user's selection, and, according to the result of the determination, acquire information 1820 on the designated user's selection. For example, the electronic device 501 may determine whether there is information 1820 on the user's selection, corresponding to the currently selected two or more applications (e.g., the first application 1801 and the second application 1802) and pieces of context information of the two or more applications, among the pre-stored information on the user's selection. When there is the corresponding information 1820 on the user's selection, the electronic device 501 may acquire the information 1820 on the user's selection. For example, as shown in FIG. 18A, the currently identified applications may be the first application 1801 and the second application 1802, and context information corresponding to each parameter may indicate user login and a first pass (an unlimited pass). The electronic device 501 may acquire, among the pre-stored information on the user's selection, information 1820 on the user's selection, wherein the identified applications are the first application 1801 and the second application 1802, and context information corresponding to each parameter indicates user login and a first pass (an unlimited pass). As shown in FIG. 18B, the electronic device 501 may select, from among the two applications, an application (e.g., the first application 1801) selected by the user, by using the acquired information 1820 on the user's section. The intelligent server 503 may receive information on the selected application (e.g., the first application 1801 (e.g., App A)) from the electronic device 501, and transmit result information acquired by processing the user utterance by using a voice assistant app corresponding to the selected application, to the electronic device 501. As shown in 1704 of FIG. 17, the electronic device 501 may control the first application 1801 to perform a function corresponding to the user utterance (e.g., a function of reproducing song A) according to the result information.

According to various embodiments, when there is no information on the user's selection, corresponding to context information of the currently identified applications and/or current collected applications, among the previously stored information on the user's selection, the electronic device 501 may receive a user's selection by displaying information on the currently identified applications (e.g., the first application 1801 and the second application 1802).

Various embodiments may provide an intelligent server (e.g., the intelligent server 503 of FIG. 5) including: a communication circuit (e.g., the second communication circuit 640 of FIG. 6A); and at least one processor (e.g., the second processor 630 of FIG. 6A), wherein the at least one processor (the second processor 630 of FIG. 6A) is configured to: receive a user utterance from an electronic device (e.g., the electronic device 501 of FIG. 5) via the communication circuit (e.g., the second communication circuit 640 of FIG. 6A); identify a first category associated with the received user utterance, among the plurality of categories stored in the intelligent server (e.g., the intelligent server 503 of FIG. 5); identify the plurality of voice assistant apps included in the first category; transmit information on the plurality of voice assistant apps to the electronic device (e.g., the electronic device 501 of FIG. 5); receive, from the electronic device (e.g., the electronic device 501 of FIG. 5), information on a first application, which is identified to satisfy a designated condition included in the information on the plurality of voice assistant apps according to one or more parameters associated with a function corresponding to the user utterance; identify a first voice assistant app corresponding to the first application among the plurality of voice assistant apps by using the information on the first application; generate result information for performing the function corresponding to the user utterance by using the first voice assistant app; and transmit the generated result information to the electronic device (e.g., the electronic device 501 of FIG. 5).

Various embodiments may provide an intelligent server (e.g., the intelligent server 503 of FIG. 5), wherein the at least one processor (e.g., the second processor 630 of FIG. 6A) identifies the number of voice assistance apps included in the first category, and acquires the information on the plurality of voice assistant apps included in the first category when the identified number is greater than one, and the information on the plurality of voice assistant apps includes the plurality of pieces of identification information for identifying the plurality of applications corresponding to the plurality of voice assistant apps, one or more parameters corresponding to one or more pieces of context information of the plurality of applications associated with the function corresponding to the user utterance, and information on the condition to be satisfied by the one or more pieces of context information corresponding to the one or more parameters.

Various embodiments may provide an intelligent server (e.g., the intelligent server 503 of FIG. 5), wherein the one or more parameters include at least one of a value or text for identifying the one or more pieces of context information, and the information on the condition includes at least one of a value or text indicating the condition.

Various embodiments may provide an intelligent server (e.g., the intelligent server 503 of FIG. 5), wherein the one or more pieces of context information of the first application identified according to the one or more parameters satisfy the condition.

Various embodiments may provide an intelligent server (e.g., the intelligent server 503 of FIG. 5), wherein the first application is implemented to identify the one or more pieces of context information while the first application is being executed.

Various embodiments may provide an intelligent server (e.g., the intelligent server 503 of FIG. 5) further including a database (e.g., the database 650 of FIG. 6A), wherein the at least one processor (e.g., the second processor 630 of FIG. 6A) is configured to: store, in the database (e.g., the database 650 of FIG. 6A), the plurality of pieces of information including one or more first parameters according to the plurality of functions and information on the condition to be satisfied by one or more pieces of first context information corresponding to the one or more first parameters; and identify the one or more parameters associated with the function corresponding to the user utterance and the information on the condition corresponding to the one or more parameters, by using the plurality of pieces of information.

Various embodiments may provide an intelligent server (e.g., the intelligent server 503 of FIG. 5), wherein the at least one processor (e.g., the second processor 630 of FIG. 6A) is configured to: acquire at least one piece of text corresponding to the user utterance; identify the function associated with the user utterance according to the at least one piece of text; and acquire information on one or more different parameters and different conditions according to a type of the identified function.

Various embodiments may provide an intelligent server (e.g., the intelligent server 503 of FIG. 5), wherein the at least one processor (e.g., the second processor 630 of FIG. 6A) is configured to: when the identified function is a first function for reproducing a part of music, acquire a first parameter corresponding to first context information associated with login of a user of the electronic device (e.g., the electronic device 501 of FIG. 5) and information on a first condition corresponding to the first parameter; and when the identified function is a second function for reproducing an entire part of music, acquire a first parameter corresponding to first context information associated with login of a user of the electronic device (e.g., the electronic device 501 of FIG. 5), information on the first condition corresponding to the first parameter, a second parameter corresponding to second context information associated with a type of a pass of the user, and information on the second condition corresponding to the second parameter.

Various embodiments may provide an electronic device (e.g., the electronic device 501 of FIG. 5) including: a microphone (e.g., the microphone 620 of FIG. 6A); a communication circuit (e.g., the first communication circuit 622 of FIG. 6A); and at least one processor (e.g., the first processor 610 of FIG. 6A), wherein the at least one processor (e.g., the first processor 610 of FIG. 6A) is configured to: acquire, based on an intelligent application for providing a voice recognition service, a user utterance by using the microphone (e.g., the microphone 620 of FIG. 6A); transmit the user utterance to an intelligent server (e.g., the intelligent server 503 of FIG. 5) via the communication circuit (e.g., the first communication circuit 622 of FIG. 6A); receive first information on the plurality of voice assistant apps corresponding to the user utterance, from the intelligent server (e.g., the intelligent server 503 of FIG. 5); acquire one or more pieces of context information of the plurality of applications corresponding to one or more parameters associated with a function corresponding to the user utterance, the one or more parameters being included in the first information; identify a first application having the one or more pieces of context information satisfying a designated condition included in the first information, among the plurality of applications; transmit information on the identified first application to the intelligent server (e.g., the intelligent server 503 of FIG. 5) via the communication circuit (e.g., the first communication circuit 622 of FIG. 6A); and receive result information from the intelligent server (e.g., the intelligent server 503 of FIG. 5) when the information on the first application is transmitted, and control the first application to perform the function corresponding to the user utterance according to the received result information.

Various embodiments may provide an electronic device (e.g., the electronic device 501 of FIG. 5), wherein the at least one processor (e.g., the first processor 610 of FIG. 6A) is configured to: acquire the plurality of pieces of identification information which correspond to the plurality of applications corresponding to the plurality of voice assistant apps and are included in the first information; and identify the plurality of applications corresponding to the plurality of pieces of identification information among the plurality of first applications installed in the electronic device (e.g., the electronic device 501 of FIG. 5).

Various embodiments may provide an electronic device (e.g., the electronic device 501 of FIG. 5), wherein the at least one processor (e.g., the first processor 610 of FIG. 6A) is configured to acquire one or more pieces of context information corresponding to a value or text included in the one or more parameters, among the plurality of pieces of information on the plurality of applications.

Various embodiments may provide an electronic device (e.g., the electronic device 501 of FIG. 5), wherein the plurality of applications are implemented to identify the one or more pieces of context information while the first application is being executed, and the at least one processor (e.g., the first processor 610 of FIG. 6A) is configured to acquire the one or more pieces of context information upon a request for the one or more pieces of context information from the plurality of applications.

Various embodiments may provide an electronic device (e.g., the electronic device 501 of FIG. 5), wherein the at least one processor (e.g., the first processor 610 of FIG. 6A) is configured to: determine whether the one or more pieces of context information of the respective the plurality of applications satisfy the condition; and identify the first application having the one or more pieces of context information satisfying the condition, among the plurality of applications according to a result of the determination.

Various embodiments may provide an electronic device (e.g., the electronic device 501 of FIG. 5), wherein at least some of the one or more pieces of context information of one or more applications remaining after excluding the first application from among the plurality of applications fail to satisfy the condition.

Various embodiments may provide an electronic device (e.g., the electronic device 501 of FIG. 5), wherein the at least one processor (e.g., the first processor 610 of FIG. 6A) is configured to receive the first information including information on one or more different parameters and different conditions according to a function corresponding to the user utterance.

Various embodiments may provide an electronic device (e.g., the electronic device 501 of FIG. 5), wherein the least one processor (e.g., the first processor 610 of FIG. 6A) is configured to: when the function corresponding to the user utterance is a first function for reproducing a part of music, acquire a first parameter associated with login of a user of the electronic device (e.g., the electronic device 501 of FIG. 5) and information on a first condition corresponding to the first parameter; and when the function corresponding to the user utterance is a second function for reproducing an entire part of music, acquire a first parameter associated with login of a user of the electronic device (e.g., the electronic device 501 of FIG. 5), information on the first condition corresponding to the first parameter, a second parameter associated with a type of a pass of the user, and information on the second condition corresponding to the second parameter.

Various embodiments may provide an electronic device (e.g., the electronic device 501 of FIG. 5), wherein the at least one processor (e.g., the first processor 610 of FIG. 6A) is configured to: when two or more applications having the one or more pieces of context information satisfying the condition are identified among the plurality of applications, display information on the two or more applications; receive an input for selecting the first application from among the two or more applications, from a user of the electronic device (e.g., the electronic device 501 of FIG. 5); and identify the first application according to the reception of the input.

Various embodiments may provide an electronic device (e.g., the electronic device 501 of FIG. 5), wherein the at least one processor (e.g., the first processor 610 of FIG. 6A) is configured to: store information on the input for selecting the first application; and when the two or more applications are identified among the plurality of applications after the information on the input is stored, identify the first application among the two or more applications by using the stored information on the input.

Various embodiments may provide an operation method of an intelligent server (e.g., the intelligent server 503 of FIG. 5), the method including: receiving a user utterance from an electronic device (e.g., the electronic device 501 of FIG. 5) via a communication circuit (e.g., the second communication circuit 640 of FIG. 6A); identifying a first category associated with the received user utterance, among the plurality of categories stored in the intelligent server (e.g., the intelligent server 503 of FIG. 5); identifying the plurality of voice assistant apps included in the first category; transmitting information on the plurality of voice assistant apps to the electronic device (e.g., the electronic device 501 of FIG. 5); receiving, from the electronic device (e.g., the electronic device 501 of FIG. 5), information on a first application, which is identified to satisfy a designated condition included in the information on the plurality of voice assistant apps according to one or more parameters associated with a function corresponding to the user utterance; identifying a first voice assistant app corresponding to the first application, among the plurality of voice assistant apps by using the information on the first application; generating result information for performing the function corresponding to the user utterance by using the first voice assistant app; and transmitting the generated result information to the electronic device (e.g., the electronic device 501 of FIG. 5).

Various embodiments may provide an operation method of an electronic device (e.g., the electronic device 501 of FIG. 5), the method including: acquiring, based on an intelligent application for providing a voice recognition service, a user utterance by using a microphone (e.g. the microphone 620 of FIG. 6A); transmitting the user utterance to an intelligent server (e.g., the intelligent server 503 of FIG. 5) via a communication circuit (e.g., the first communication circuit 622 of FIG. 6A); receiving first information on the plurality of voice assistant apps corresponding to the user utterance, from the intelligent server (e.g., the intelligent server 503 of FIG. 5); acquiring one or more pieces of context information of the plurality of applications corresponding to one or more parameters associated with a function corresponding to the user utterance, the one or more parameters being included in the first information; identifying a first application having the one or more pieces of context information satisfying a designated condition included in the first information, among the plurality of applications; transmitting information on the identified first application to the intelligent server (e.g., the intelligent server 503 of FIG. 5) via the communication circuit (e.g., the first communication circuit 622 of FIG. 6A); and receiving result information from the intelligent server (e.g., the intelligent server 503 of FIG. 5) when the information on the first application is transmitted, and controlling the first application to perform the function corresponding to the user utterance according to the received result information.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An intelligent server comprising:
a communication circuit;
at least one processor; and
memory storing one or more programs including computer-executable instructions that, when executed by the at least one processor, cause the intelligent server to:
receive a user utterance from an electronic device via the communication circuit,
identify a first category associated with the user utterance; from among a plurality of categories stored in the intelligent server,
identify a plurality of voice assistant applications included in the first category,
identify a number of the plurality of voice assistance applications included in the first category,
based on the number of the plurality of voice assistance applications included in the first category being greater than one, obtain information about the plurality of voice assistant applications included in the first category,
transmit, to the electronic device, the information about the plurality of voice assistant applications included in the first category,
receive, from the electronic device, information about a first application, which is identified to satisfy a designated condition included in the information about the plurality of voice assistant applications based on at least one parameter associated with a function corresponding to the user utterance,
identify a first voice assistant application corresponding to the first application among the plurality of voice assistant applications by using the information about the first application,
generate result information for performing the function corresponding to the user utterance by using the first voice assistant application, and
transmit to the electronic device, the result information.

2. The intelligent server of claim 1, wherein the information about the plurality of voice assistant applications includes a plurality of pieces of identification information for identifying a plurality of applications corresponding to the plurality of voice assistant applications, at least one parameter corresponding to at least one piece of context information of the plurality of applications associated with the function corresponding to the user utterance, and information about the designated condition to be satisfied by the piece of context information corresponding to the at least one parameter.

3. The intelligent server of claim 2,
wherein the at least one parameter includes at least one of a value or text for identifying the plurality of pieces of context information, and
wherein the information about the designated condition includes at least one of a value or text indicating the designated condition.

4. The intelligent server of claim 3, wherein the plurality of pieces of context information of the first application identified based on the at least one parameter satisfy the designated condition.

5. The intelligent server of claim 4, wherein the first application is configured to identify the at least one piece of context information while the first application is being executed.

6. The intelligent server of claim 2, further comprising:
a database,
wherein the one or more programs further include computer-executable instructions that, when executed by the at least one processor, cause the intelligent server to:
store, in the database, the plurality of pieces of information comprising at least one first parameter based on the plurality of functions and information about the designated condition to be satisfied by at least one piece of first context information corresponding to the at least one first parameter, and identify the at least one parameter associated with the function corresponding to the user utterance and the information about the designated condition corresponding to the at least one parameter, by using the plurality of pieces of information.

7. The intelligent server of claim 6, wherein the one or more programs further include computer-executable instructions that, when executed by the at least one processor, cause the intelligent server to:
obtain at least one piece of text corresponding to the user utterance,
identify the function associated with the user utterance based on the at least one piece of text, and
obtain information about the at least one parameter and information about the designated condition based on a type of the identified function.

8. The intelligent server of claim 7, wherein the one or more programs further include computer-executable instructions that, when executed by the at least one processor, cause the intelligent server to:
based on the identified function is-being a first function for reproducing a part of music, obtain a first parameter corresponding to first context information associated with login of a user of the electronic device and information about a first condition corresponding to the first parameter, and
based on the identified function being a second function for reproducing an entire part of music, with a first parameter corresponding to first context information associated with login of a user of the electronic device, information about the first condition corresponding to the first parameter, a second parameter corresponding to second context information associated with a type of a pass of the user, and information about a second condition corresponding to the second parameter.

9. An electronic device comprising:
a microphone;
a communication circuit;
at least one processor; and
memory storing one or more programs including computer-executable instructions that, when executed by the at least one processor, cause the electronic device to:
acquire, based on an intelligent application for providing a voice recognition service, a user utterance by using the microphone,
transmit, to an intelligent server, the user utterance via the communication circuit,
receive, from the intelligent server, first information about a plurality of voice assistant applications corresponding to the user utterance,
identify a number of the plurality of voice assistance applications,
based on the number of the plurality of voice assistance applications being greater than one, obtain at least one piece of context information of a plurality of applications corresponding to at least one parameter associated with a function corresponding to the user utterance, the at least one parameter being included in the first information,
identify a first application having the at least one piece of context information satisfying a designated condition comprised in the first information, among the plurality of applications,
transmit, to the intelligent server, information about the first application via the communication circuit,
receive, from the intelligent server, result information when the information about the first application is transmitted, and
control the first application to perform the function corresponding to the user utterance based on the received result information.

10. The electronic device of claim 9, wherein the one or more programs further include computer-executable instructions that, when executed by the at least one processor, cause the electronic device to:
acquire a plurality of pieces of identification information which correspond to the plurality of applications corresponding to the plurality of voice assistant applications and are comprised in the first information,
obtain at least one piece of context information corresponding to a value or text comprised in the at least one parameter, among the plurality of pieces of information about the plurality of applications, and
identify the plurality of applications corresponding to the plurality of pieces of identification information among the plurality of first applications installed in the electronic device.

11. The electronic device of claim 10,
wherein the plurality of applications are implemented to identify the at least one piece of context information while the plurality of applications are being executed, and
wherein the one or more programs further include computer-executable instructions that, when executed by the at least one processors, cause the electronic device to:
obtain the one or more pieces of context information upon a request for the one or more pieces of context information from the plurality of applications.

12. The electronic device of claim 11, wherein the one or more programs further include computer-executable instructions that, when executed by the at least one processor, cause the electronic device to:
in response to identifying two or more applications having the at least one piece of context information satisfying the designated condition among the plurality of applications, display information about the two or more applications,
receive, from a user of the electronic device, an input for selecting the first application from among the two or more applications,
identify the first application based on the receiving of the input,
store information about the input for selecting the first application, and
based on the two or more applications being identified among the plurality of applications after the information on the input is stored, identify the first application among the two or more applications by using the stored information about the input.

13. The electronic device of claim 10, wherein the one or more programs further include computer-executable instructions that, when executed by the at least one processor, cause the electronic device to:
determine whether the one or more pieces of context information of the respective plurality of applications satisfy the designated condition, and
identify the first application having the at least one piece of context information satisfying the designated condition, among the plurality of applications based on a result of the determination.

14. The electronic device of claim 13, wherein at least some of the at least one piece of context information of at least one application remaining after excluding the first application from among the plurality of applications fail to satisfy the designated condition.

15. The electronic device of claim 13, wherein the one or more programs further include computer-executable instructions that, when executed by the at least one processor, cause the electronic device to:
- receive the first information comprising information about the at least one parameter and information about the designated condition which are identified based on a function corresponding to the user utterance,
- based on the function corresponding to the user utterance being a first function for reproducing a part of music, obtain a first parameter associated with login of a user of the electronic device and information about a first condition corresponding to the first parameter, and
- based on the function corresponding to the user utterance being a second function for reproducing an entire part of music, obtain a first parameter associated with login of a user of the electronic device, information about the first condition corresponding to the first parameter, a second parameter associated with a type of a pass of the user, and information about a second condition corresponding to the second parameter.

* * * * *